(12) United States Patent
Suzuki

(10) Patent No.: US 7,969,870 B2
(45) Date of Patent: Jun. 28, 2011

(54) LINE ACCOMMODATING DEVICE

(75) Inventor: Toshihiro Suzuki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 122 days.

(21) Appl. No.: 12/409,905

(22) Filed: Mar. 24, 2009

(65) Prior Publication Data

US 2009/0245100 A1    Oct. 1, 2009

(30) Foreign Application Priority Data

Mar. 31, 2008   (JP) ................... 2008-090933

(51) Int. Cl.
*G01R 31/08* (2006.01)
(52) U.S. Cl. .......... 370/225; 370/216; 370/465
(58) Field of Classification Search ......... 370/225, 370/216, 389, 229, 468, 424
See application file for complete search history.

(56) References Cited

U.S. PATENT DOCUMENTS

| | | | |
|---|---|---|---|
| 6,532,240 B1 * | 3/2003 | Jeong .................. | 370/465 |
| 2003/0220110 A1 * | 11/2003 | Kizu et al. ............ | 455/445 |
| 2006/0221814 A1 * | 10/2006 | Bamba ................. | 370/216 |

FOREIGN PATENT DOCUMENTS

| | | |
|---|---|---|
| JP | 2006-279891 | 10/2006 |
| WO | WO 2005/015851 | 2/2005 |

* cited by examiner

*Primary Examiner* — Ricky Ngo
*Assistant Examiner* — David Oveissi
(74) *Attorney, Agent, or Firm* — Staas & Halsey LLP

(57) ABSTRACT

A line accommodating device for accommodating lines of a first communication network and a second communication network, the line accommodating device includes an interface connecting to the first communication network; a connecting block for connecting to the interface; and a plurality of relay modules connecting to the connecting block and the second communication network, respectively, each of the relay module including a reporting unit for notifying the connected relay modules via the connecting block of identification information of the relay module's own, an obtaining unit for obtaining identification information of the connected relay modules via the connecting block, and a controller including processes of determining at least one connection target of the relay module in the properly obtained identification information of the relay module by the obtaining unit, and controlling for switching the connection target of the relay module in accordance with a determined result of the determining.

9 Claims, 15 Drawing Sheets

FIG. 10

| SLOT NUMBER | PRESENCE/ABSENCE OF REPORT |
|---|---|
| Slot1 | ○ |
| Slot2 | × |
| Slot3 | ○ |
| Slot4 | ○ |
| Slot5 | × |
| Slot6 | ○ |

FIG. 11

| SLOT NUMBER | PRESENCE/ABSENCE OF REPORT |
|---|---|
| Slot1 | ○ |
| Slot2 | × |
| Slot3 | × |
| Slot4 | ○ |
| Slot5 | × |
| Slot6 | ○ |

FIG. 13

| SLOT NUMBER | PRESENCE/ABSENCE OF REPORT |
|---|---|
| Slot1 | ○ |
| Slot2 | × |
| Slot3 | × |
| Slot4 | ○ |
| Slot5 | × |
| Slot6 | × |

LINE ACCOMMODATING DEVICE

CROSS-REFERENCE TO RELATED APPLICATION

This application is based upon and claims the benefit of priority of the prior Japanese Patent Application No. 2008-090933, filed on Mar. 31, 2008, the entire contents of which are incorporated herein by reference.

FIELD

The embodiments discussed herein are related to a line accommodating device in communication network.

BACKGROUND

A resilient packet ring (RPR) is a scheme, defined in IEEE 802.17, for providing relief against a network failure. The RPR is a system in which multiple RPR relay devices are connected by two ring-type transmission paths for clockwise and anticlockwise transmissions and the two transmission paths are switched so as to bypass a transmission path and/or a station where a failure occurred, to thereby provide relief against a network failure. For example, refer to Japanese Laid-open Patent Publication No. 2006-279891 and International Publication Pamphlet No. WO 2005/015851.

As the communications media for the RPR, for example, SONET/SDH transmission paths are used. In this case, through the use of Generic Framing Procedure (GFP) and Virtual Concatenate (VCAT), an RPR frame is mapped on a SONET frame for transmission on the SONET/SDH transmission paths.

Also, in general, a line accommodating device that can provide large-capacity line services employs a shelf structure. An RPR relay device is realized in the form of a card, such as a station, and can be freely attached to and detached from the shelf of the line accommodating device. Thus, when the number of lines is increased, multiple stations may be accommodated in one shelf or stations accommodated in one shelf may belong to multiple RPR networks.

With such a configuration, when a failure occurs in one of the stations, which are RPR relay devices, an RPR failure recovery function works but a failure recovery function for yet another failure is lost. As opposed to it, a technology is disclosed in which a management unit detects a failure in each station and a connection path of stations where no failure is occurring is formed so as to bypass the station where the failure occurred. For example, refer to Japanese Laid-open Patent Publication No. 2006-279891.

However, in the related technologies noted above, when a failure occurs in a station during occurrence of a failure in the management unit, there is a problem in that switching to a connection path that bypasses the station where the failure occurred cannot be performed. Thus, when the network does not have a failure recovery function, such as an RPR, there is a problem in that the portion of the network which is in an interrupted state due to the station failure cannot be recovered from the interrupted state.

Also, when the network is an RPR network and a station where a failure occurred remains on the network, the RPR-based failure recovery function works, but the redundancy function is lost. Thus, there is a problem in that relief cannot be provided during occurrence of another failure.

Also, the management unit also performs overall line accommodating device control, such as control of each station for switching between the signal transmission paths on the network. Thus, when the management unit performs processing for detecting a failure through constant monitoring of the state of each station and/or processing such as re-formation of the connection path of the stations when a failure is detected, there is a problem in that a load on the management unit increases. As a result, it is conceivable that the functions of the management unit which include detection of a failure in each station and re-formation of a connection path cannot be fully exercised.

SUMMARY

According to an aspect of the invention, a line accommodating device for accommodating lines of a first communication network and a second communication network, the line accommodating device includes an interface connecting to the first communication network; a connecting block for connecting to the interface; and a plurality of relay modules connecting to the connecting block and the second communication network, respectively, each of the relay module including a reporting unit for notifying the connected relay modules via the connecting block of identification information of the relay module's own, an obtaining unit for obtaining identification information of the connected relay modules via the connecting block, and a controller including processes of determining at least one connection target of the relay module in the properly obtained identification information of the relay module by the obtaining unit, and controlling for switching the connection target of the relay module in accordance with a determined result of the determining.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

FIG. 10 is a drawing part 1 illustrating a table created by a control unit.

FIG. 11 is a drawing part 2 illustrating a table created by the control unit.

FIG. 13 is a drawing part 3 illustrating a table created by the control unit.

DESCRIPTION OF EMBODIMENTS

Preferred embodiments of a line accommodating device and a control method will be described below in detail with reference to the accompanying drawings.

Overview of Line Accommodating Device

Figure 1:
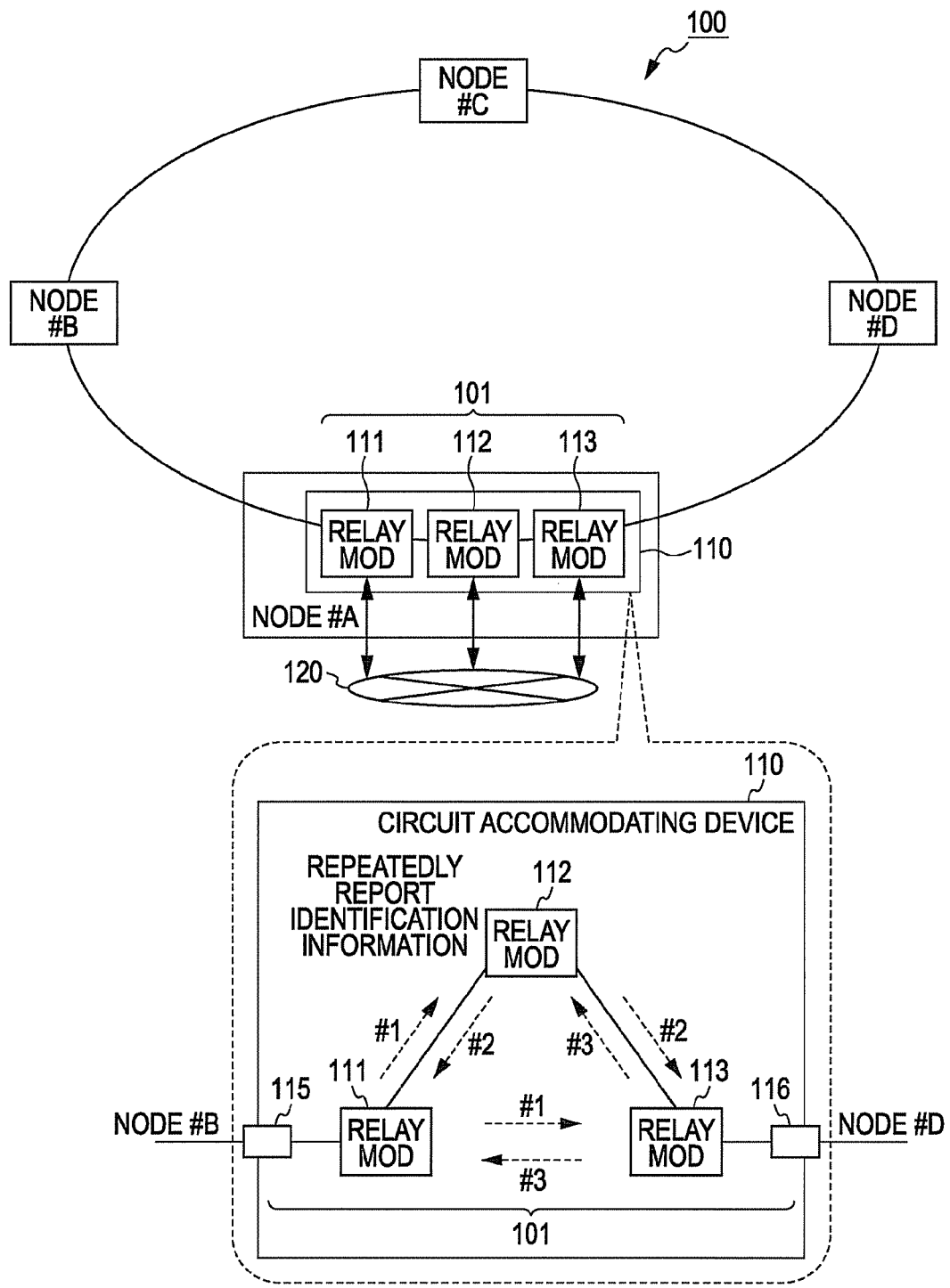
FIG. 1 is a diagram part 1 illustrating an overview of this line accommodating device.

FIG. 1 is a diagram (part 1) illustrating an overview of this line accommodating device. A network 100 illustrated in FIG. 1 is a ring-type network in which nodes #A to #D are connected in a ring shape. The node #A is provided with a line accommodating device 110. The line accommodating device 110 accommodates relay modules 111 to 113 (Relay MODs). The relay modules 111 to 113 are connected in series so as to form a portion 101 of the network 100.

Also, the individual relay modules 111 to 113 are connected to a network 120 that is different from the network 100, as indicated by up-down solid-line arrows. The network 120 to which the relay modules 111 to 113 are connected may be a network that is different for each of the relay modules 111 to 113 or may be the identical network.

A portion surrounded by a dotted line schematically indicates the relationships of connections of the relay modules 111 to 113 in the line accommodating device 110. A first interface 115 is provided at an end of the line accommodating device 110, the end being adjacent to the node #B, and performs communication with the node #B. A second interface 116 is provided at an end of the line accommodating device 110, the end being adjacent to the node #D, and performs communication with the node #D.

The relay modules 111 to 113 are connected in series between the first interface 115 and the second interface 116. That is, each of the relay modules 111 to 113 has at least two connection targets (hereinafter referred to an "east-side connection target" and a "west-side connection target") that are each connected to the first interface 115, the second interface 116, or another relay module.

The relay module 111 is connected to the first interface 115 and the relay module 112. The relay module 112 is connected to the relay module 111 and the relay module 113. The relay module 113 is connected to the relay module 112 and the second interface 116.

In this manner, the relay modules 111 to 113 are connected in series between the first interface 115 and the second interface 116 to thereby form, in the network 100, the portion 101 of a path that heads counterclockwise from the node #B to the node #D (or a path that heads clockwise from the node #D to the node #B).

Each of the relay modules 111 to 113 repeatedly reports identification information (dotted-line arrows) for identifying the self module to, of the relay modules 111 to 113, the relay modules that are different from the self module. Also, each of the relay modules 111 to 113 obtains the identification information repeatedly reported from the other relay modules. The repeated reporting means periodical or irregular, continuous reporting (e.g., reporting at a period of several milliseconds).

For example, the relay module 111 repeatedly reports identification information #1 for identifying the relay module 111 to the relay module 112 and the relay module 113. Also, the relay module 111 obtains identification information #2 for identifying the relay module 112, the identification information #2 being repeatedly reported from the relay module 112, and identification information #3 for identifying the relay module 113, the identification information #3 being repeatedly reported from the relay module 113.

The reporting of the identification information is performed using a control-signal line (not illustrated) that interconnects the relay modules 111 to 113. The control-signal line is always reserved regardless of the state of a main-signal line for forming the portion 101 of the network 100. The control-signal line may be provided separately from the main-signal line or may be provided utilizing part of the main-signal line.

Figure 2:
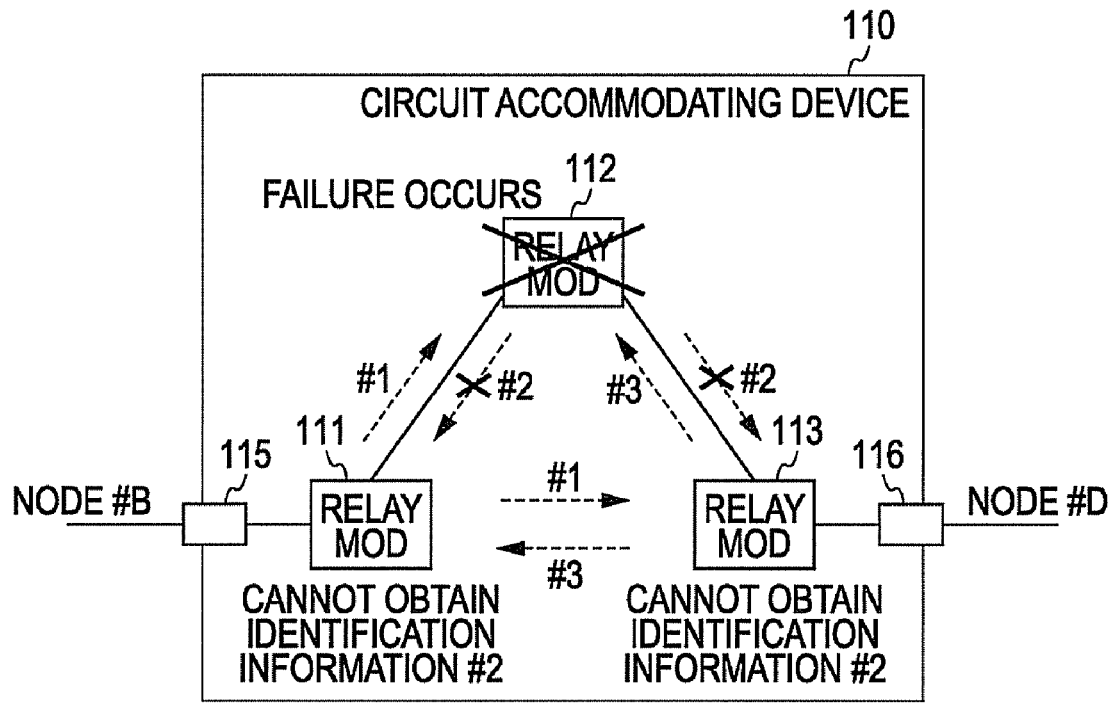
FIG. 2 is a diagram part 2 illustrating an overview of this line accommodating device.

FIG. 2 is a diagram (part 2) illustrating an overview of this line accommodating device. In FIG. 2, the same portions as those illustrated in FIG. 1 are denoted by the same reference numerals, and descriptions thereof are omitted. A case in which a failure occurs in the relay module 112, as illustrated in FIG. 2, is described. When a failure occurs in the relay module 112, an interrupted state occurs in the portion 101 of the network 100, the portion 101 being formed by the relay modules 111 to 113, and thus the network 100 fails.

Meanwhile, when a failure occurs in the relay module 112, the relay module 112 may not report the identification information #2, or may not report it in a normal state even if possible. Thus, the relay module 111 and the relay module 113 may not properly detect the identification information #2. Therefore, the relay module 111 and the relay module 113 can detect the occurrence of the failure in the relay module 112.

In contrast, the relay module 111 and the relay module 113 switch the connection targets to recover the portion 101 of the network 100 from the interrupted state. Specifically, the relay module 111 and the relay module 113 determine the connection-target relay module(s) of the relay module(s) indicated by identification information that has been properly obtained at the time.

When multiple pieces of identification information which have been properly obtained exist, the relay modules indicated by identification information having the next smaller value than the value of the identification information of the self module and identification information having the next larger value than the identification information of the self module, of the multiple pieces of identification information, are determined as the connection-target relay modules. The value of the identification information is a value that is determined by the identification information and that differs for each piece of identification information.

For example, when the identification information is information indicating a numeric value or a number, the value of the identification information is the numeric value or number itself. Also, when the identification information is not information indicating a numeric value or a number, the value of the identification information is a value obtained by converting the identification information into a numeric value in accordance with a rule that is common to the relay modules. This rule is a rule that can convert the identification information into a numeric value that is different for each piece of identification information.

For example, when the identification information is information indicating the name of the relay module, the value of the identification information is a value obtained by converting the character string of the name into a character code. The use of values different for the respective pieces of the identification information and the interconnection of the relay modules having the values that are the closest to each other, as described above, makes it possible to form a connection path that directly connects all relay modules where no failure is occurring.

Also, when each relay module does not properly obtain identification information having a value smaller than the value of the identification information of the self module, the relay module determines, as the connection targets, the first interface 115 and the relay module indicated by identification information having the next larger value than the identification information of the self module. Also, when each relay module does not properly obtain identification information having a value larger than the value of the identification information of the self module, the relay module determines, as the connection targets, the relay module indicated by identification information having the next smaller value than the value of the identification information of the self module and the second interface 116.

In this case, the relay module 111 has not obtained identification information having a value smaller than the identification information #1 of the self module. Thus, the relay module 111 determines that the west-side connection target is the first interface 115. Also, the relay module 111 has properly obtained the identification information #3 reported from the relay module 113. Thus, the relay module 111 determines that the east-side connection target is the relay module 113.

Also, the relay module 113 has properly obtained the identification information #1 reported from the relay module 111. Thus, the relay module 113 determines that the west-side connection target is the relay module 111. Also, the relay module 113 has not obtained identification information having a value larger than the identification information #3 of the self module. Thus, the relay module 113 determines that the east-side connection target is the second interface 116.

Also, in this case, since the relay module 111 and the relay module 113 have only one piece of identification information that has been property obtained, the connection targets can be uniquely determined without performing comparison of the values of the identification information. Also, although a case in which a failure occurs in the relay module 112 has been described above, the above-described determination method can also be used to form a connection path even in a case in which a failure occurs in the relay module 111 or the relay module 113.

Figure 3:
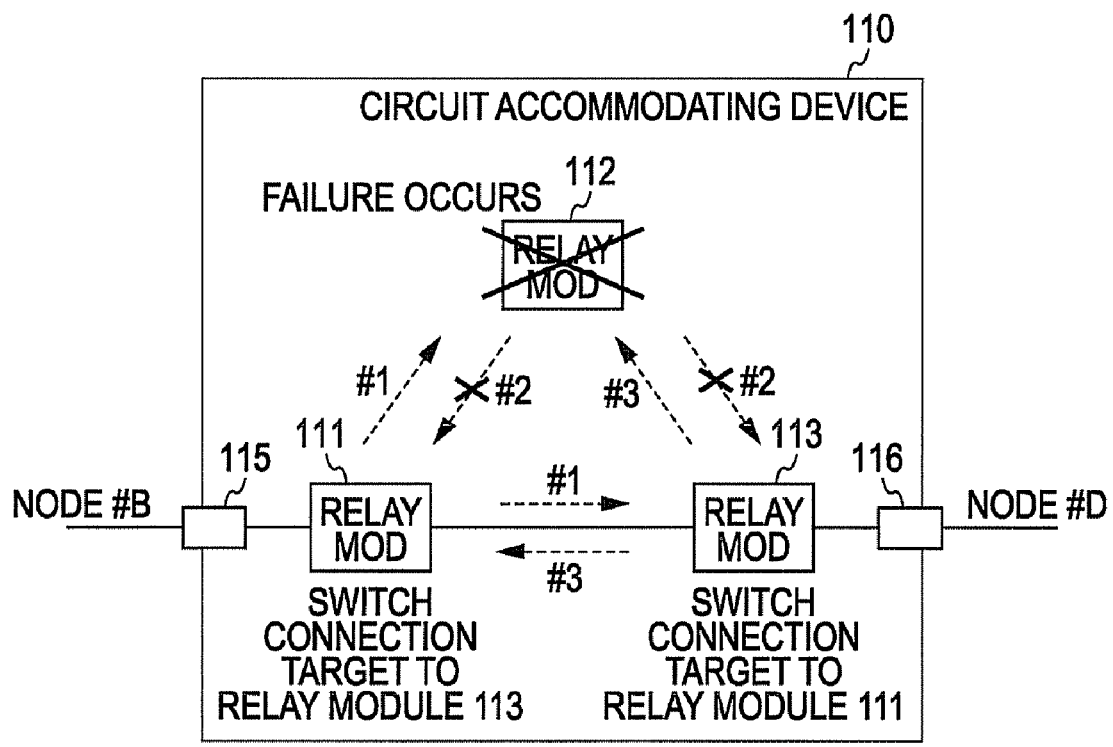
FIG. 3 is a diagram part 3 illustrating an overview of this line accommodating device.

FIG. 3 is a diagram (part 3) illustrating an overview of this line accommodating device. In FIG. 3, the same portions as those illustrated in FIG. 2 are denoted by the same reference numerals, and descriptions thereof are omitted. As illustrated in FIG. 3, the relay module 111 switches the east-side connection target from the relay module 112 to the relay module 113, on the basis of the result of the determination (the determination result) described in FIG. 2.

The first interface 115 is maintained as the west-side connection target of the relay module 111. Also, the relay module 113 switches the west-side connection target from the relay module 112 to the relay module 111, on the basis of the determination described in FIG. 2. The second interface 116 is maintained as the east-side connection target of the relay module 113.

In this manner, the relay module 111 and the relay module 113 can automatically switch the connection targets when a failure occurs in the relay module 112. Also, the connection path formed by the connection-target switching performed by the relay module 111 and the relay module 113 serves as a path that bypasses the relay module 112 where the failure occurred. Thus, it is possible to recover the portion 101 of the network 100 from the interrupted state.

The relay modules report the identification information at the same reporting timing. In this case, the relay modules create information illustrating a list of the pieces of identification information simultaneously obtained at the reporting timing. The relay modules then determine that identification information contained in the information illustrating the created list is identification information that has been properly obtained. Also, the relay modules determine that identification information that is not contained in the information illustrating the created list is identification information that has not been properly obtained.

Alternatively, the relay modules may report the identification information at timings that are different from one another. In this case, every time each relay module obtains new identification information, it stores the identification information in a table. For each piece of identification information stored in the table, the relay module constantly measures elapsed time from when the identification information was obtained last time. Then, when the elapsed time exceeds a predetermined time, the relay module deletes the identification information from the table. Each relay module determines, as properly obtained identification information, the identification information stored in the table.

Although a case in which the relay module 111 and the relay module 113 detect the occurrence of a failure in the relay module 112 has been described above, the arrangement may be such that the operation for detecting the occurrence of the failure is not performed. In this case, the relay modules 111 to 113 determine connection targets each time they obtain the identification information repeatedly reported from the other relay modules. Then, when the determined connection targets are different from the current connection targets, the relay modules 111 to 113 switch the connection targets.

Specifically, in the state illustrated in FIG. 1, the relay module 111 has not obtained identification information having a value smaller than the identification information #1 of the self module. Thus, the relay module 111 determines that the west-side connection target is the first interface 115. Also, the relay module 111 has properly obtained the identification information #2 and the identification information #3. Thus, the relay module 111 determines, as the east-side connection target, the relay module 112 indicated by the identification information #2 having the next larger value than the identification information #1 of the self module.

Also, the relay module 112 has properly obtained the identification information #1 and the identification information #3. Thus, the relay module 112 determines, as the west-side connection target, the relay module 111 indicated by the identification information #1 having the next smaller value than the identification information #2 of the self module. Also, the relay module 112 determines, as the east-side connection target, the relay module 113 indicated by the identification information #3 having the next larger value than the identification information #2 of the self module.

Also, the relay module 113 has properly obtained the identification information #1 and the identification information #2. Thus, the relay module 113 determines, as the west-side connection target, the relay module 112 indicated by the identification information #2 having the next smaller value than the identification information #3 of the self module. Also, since the relay module 113 has not obtained identification information having a value larger than the identification information #3 of the self module, the relay module 113 determines that the east-side connection target is the second interface 116.

Even in such a case in which each relay module determines connection targets every time it obtains identification information repeatedly reported from the other relay modules, the connection path of the relay modules 111 to 113 is maintained before the occurrence of a failure. Then, when a failure occurs in the relay module 112, as illustrated in FIG. 2, the relay module 111 and the relay module 113 can automatically switch the connection targets, as described in FIGS. 2 and 3.

FIRST EMBODIMENT

Figure 4:
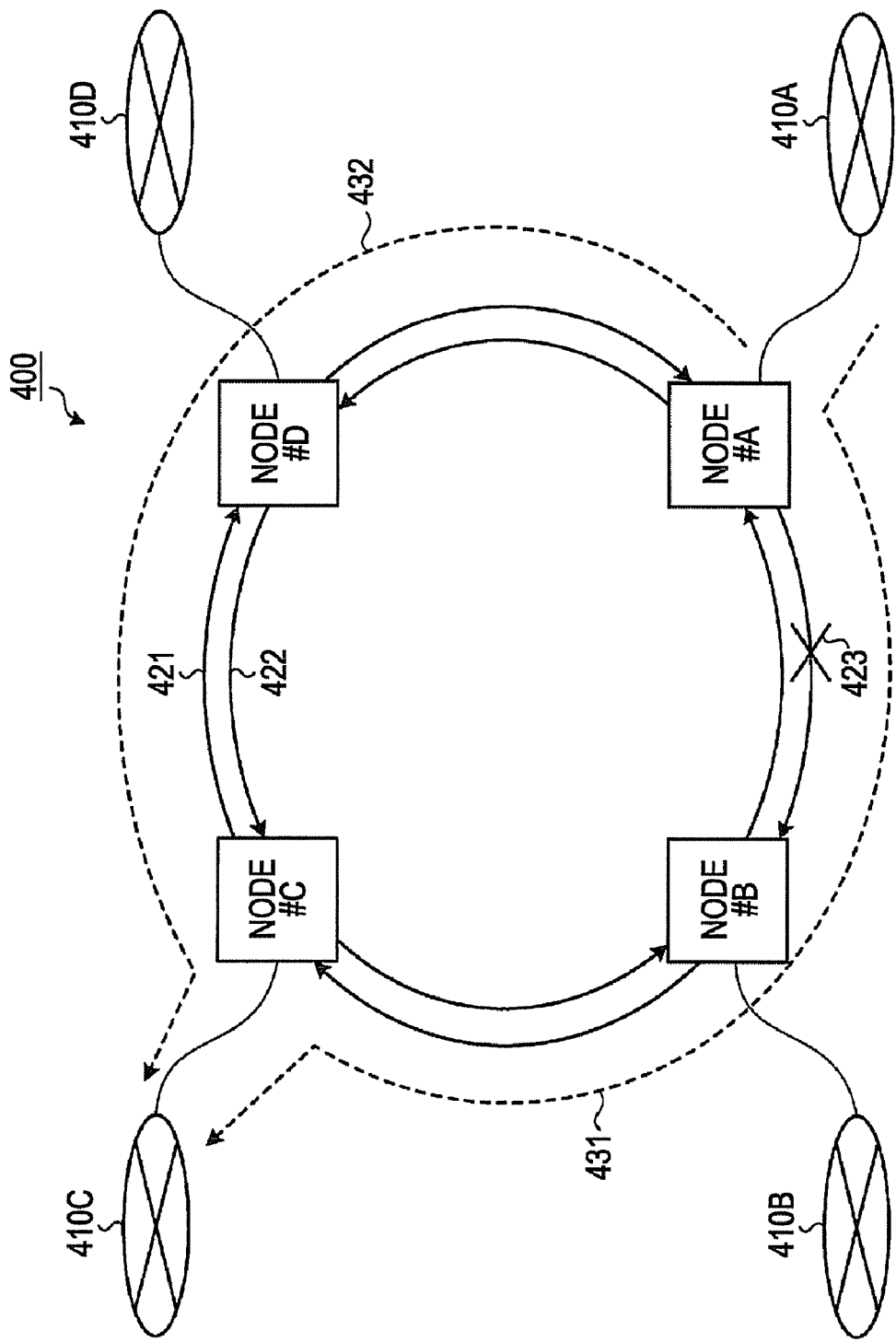
FIG. 4 is a block diagram illustrating the configuration of a network according to a first embodiment.

FIG. 4 is a block diagram illustrating the configuration of a network according to a first embodiment. As illustrated in FIG. 4, a network 400 is a ring-type network in which nodes #A to #D are connected in a ring shape. LANs (local area networks), such as user networks 410A to 410D, are connected to the nodes #A to #D, respectively.

The network 400 is an optical network for transmitting optical frames according to a standard of a SONET/SDH or the like. Also, the network 400 has a clockwise transmission path 421 and a counterclockwise transmission path 422. The network 400 is an RPR network standardized by IEEE 802.17.

For example, it is assumed that data received from the user network 410A is relayed by the node #A, the node #B, and the node #C through the use of the transmission path 421 and is transmitted to the user network 410C, as denoted by reference numeral 431. A description is given of a case in which, in this case, a failure occurs in the transmission path 421 between the node #A and the node #B, as denoted by reference numeral 423.

The node #A switches the transmission path for transmitting the data, received from the user network 410A, from the transmission path 421 to the transmission path 422. Thus, the data transmitted from the node #A is relayed by the node #D and the node #C and is transmitted to the user network 410C, as denoted by reference numeral 432. In this manner, switching between the transmission paths so as to bypass a portion where a failure occurred makes it possible to improve the tolerance of the network 400 against a failure.

Figure 5:
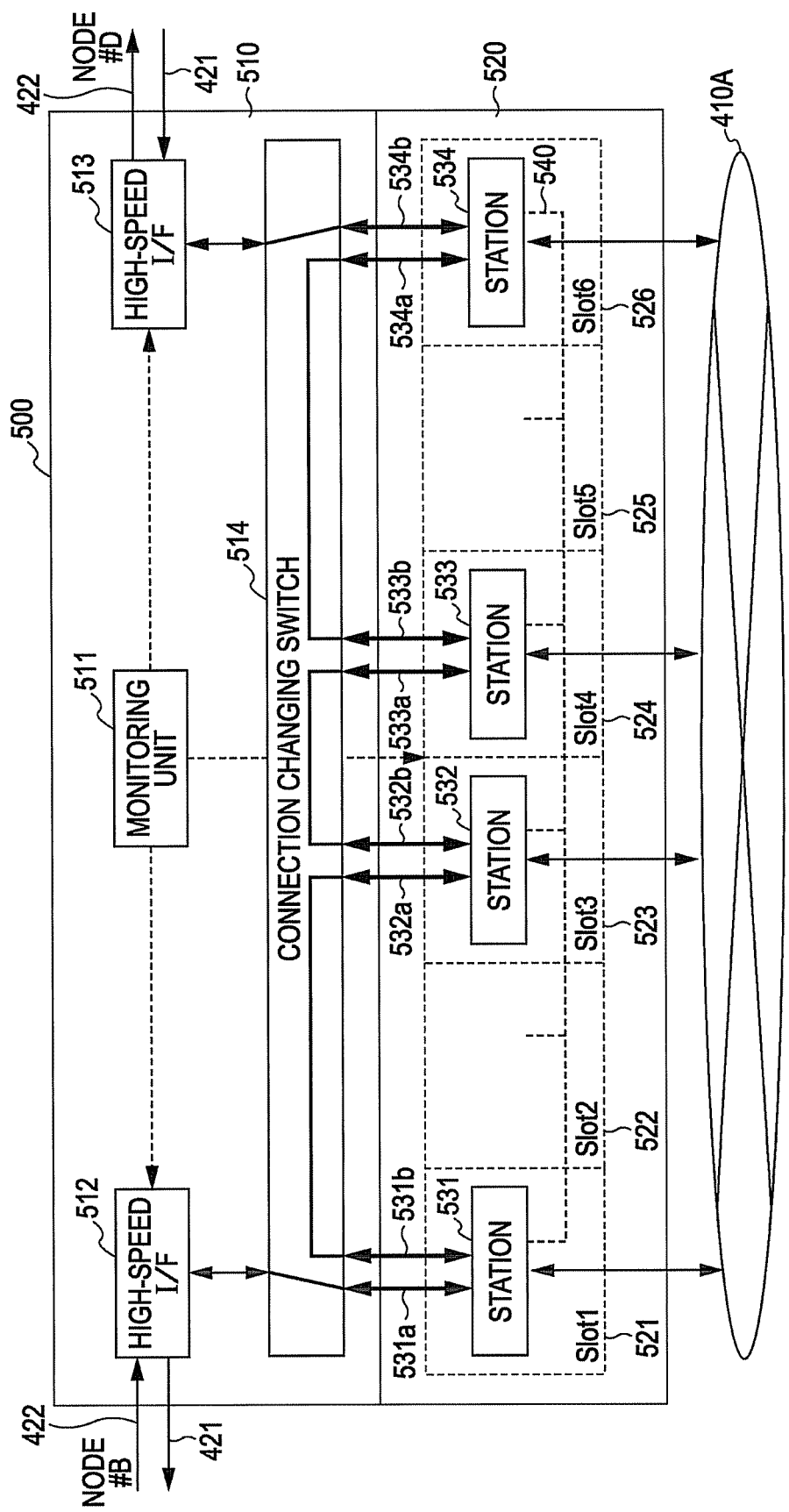
FIG. 5 is a block diagram illustrating the configuration of a line accommodating device according to the first embodiment.

FIG. 5 is a block diagram illustrating the configuration of a line accommodating device according to the first embodiment. In FIG. 5, solid lines indicate flows of data and dotted lines indicate flows of control signals (the same applies to subsequent block diagrams). The line accommodating device according to the first embodiment is a line accommodating device provided at, for example, the node #A illustrated in FIG. 4. As illustrated in FIG. 5, a line accommodating device 500 according to the first embodiment has a first shelf 510 and a second shelf 520.

The first shelf 510 is provided with a monitoring unit 511, a first high-speed I/F 512, a second high-speed I/F 513, and a connection changing switch 514. The monitoring unit 511 is responsible for overall control of the line accommodating device 500. For example, the monitoring unit 511 controls communications performed by the first high-speed I/F 512 and the second high-speed I/F 513 with other nodes, performs overall control of RPR processing, and so on. The connection changing switch 514 is a connecting block for connecting the first high-speed I/F 512, the second high-speed I/F 513 and relay modules.

The first high-speed I/F 512 performs communication with the node #B in accordance with control of the monitoring unit 511. The first high-speed I/F 512 receives an optical frame transmitted from the node #B through the transmission path 422, converts the received optical frame into an electrical signal frame, and outputs the resulting frame to the connection changing switch 514. Also, the first high-speed I/F 512 converts a frame, output from the connection changing switch 514, into an optical frame, and transmits the optical frame to the node #B through the transmission path 421.

The second high-speed I/F 513 performs communication with the node #D in accordance with control of the monitoring unit 511. The second high-speed I/F 513 receives an optical frame transmitted from the node #D through the transmission path 421, converts the received optical frame into an electrical signal frame, and outputs the resulting frame to the connection changing switch 514. Also, the second high-speed I/F 513 converts a frame, output from the connection changing switch 514, into an optical frame, and transmits the optical frame to the node #D through the transmission path 422.

The second shelf 520 has slots 521 to 526, which are arranged. Slot numbers Slot1 to Slot6 indicating the arrangement sequence of the slots are attached to the slots 521 to 526, respectively. A station can be freely attached to and detached from each of the slots 521 to 526. The station is a relay module implemented in the form of a card.

Also, the second shelf 520 is provided with a control-signal line 540 for interconnecting the slots 521 to 526. The stations accommodated in the slots 521 to 526 can report control signals each other through the use of the control-signal line 540. The control signal is, for example, the slot number of the slot that accommodates the self station.

In this case, a station 531 is accommodated in the slot 521, a station 532 is accommodated in the slot 523, a station 533 is accommodated in the slot 524, and a station 534 is accommodated in the slot 526. No stations are accommodated in the slots 522 and the slot 525. The stations 531 to 534 have configurations corresponding to the relay modules 111 to 113 illustrated in FIG. 1.

Each of the stations 531 to 534 is provided with two connection portions that are connected to the connection changing switch 514 and a connection portion connected to the user network 410A. Hereinafter, of the two connection portions connected to the connection changing switch 514, the connection portion at the left side in the figure is referred to as a "west-side connection portion" and the connection portion at the right side in the figure is referred to as an "east-side connection portion". For example, the station 531 is provided with a west-side connection portion 531a and an east-side connection portion 531b which are connected to the connection changing switch 514.

The connection changing switch 514 provided at the first shelf 510 switches connections between the stations accommodated in the slots 521 to 526. The connection changing switch 514 also switches connections between the first high-speed I/F 512 and the stations and between the second high-speed I/F 513 and the stations. The connection changing switch 514 performs switching in accordance with control of each station.

In this case, the connection changing switch 514 connects the first high-speed I/F 512 and the west-side connection portion 531a of the station 531. The connection changing switch 514 also connects the east-side connection portion 531b of the station 531 and the west-side connection portion 532a of the station 532. The connection changing switch 514 also connects the east-side connection portion 532b of the station 532 and the west-side connection portion 533a of the station 533.

Also, the connection changing switch 514 connects the east-side connection portion 533b of the station 533 and the west-side connection portion 534a of the station 534. The connection changing switch 514 also connects the east-side connection portion 534b of the station 534 and the second high-speed I/F 513. In this manner, the connection path in which the stations 531 to 534 are connected in series between the first high-speed I/F 512 and the second high-speed I/F 513 is formed.

The stations 531 to 534 connected in series form a portion of the network 400. This portion of the network 400 is a portion corresponding to the portion 101 of the network 100 illustrated in FIG. 1. The user network 410A to which the stations 531 to 534 are connected may be a network that is different for each of the stations 531 to 534 or may be the identical network.

Figure 6:
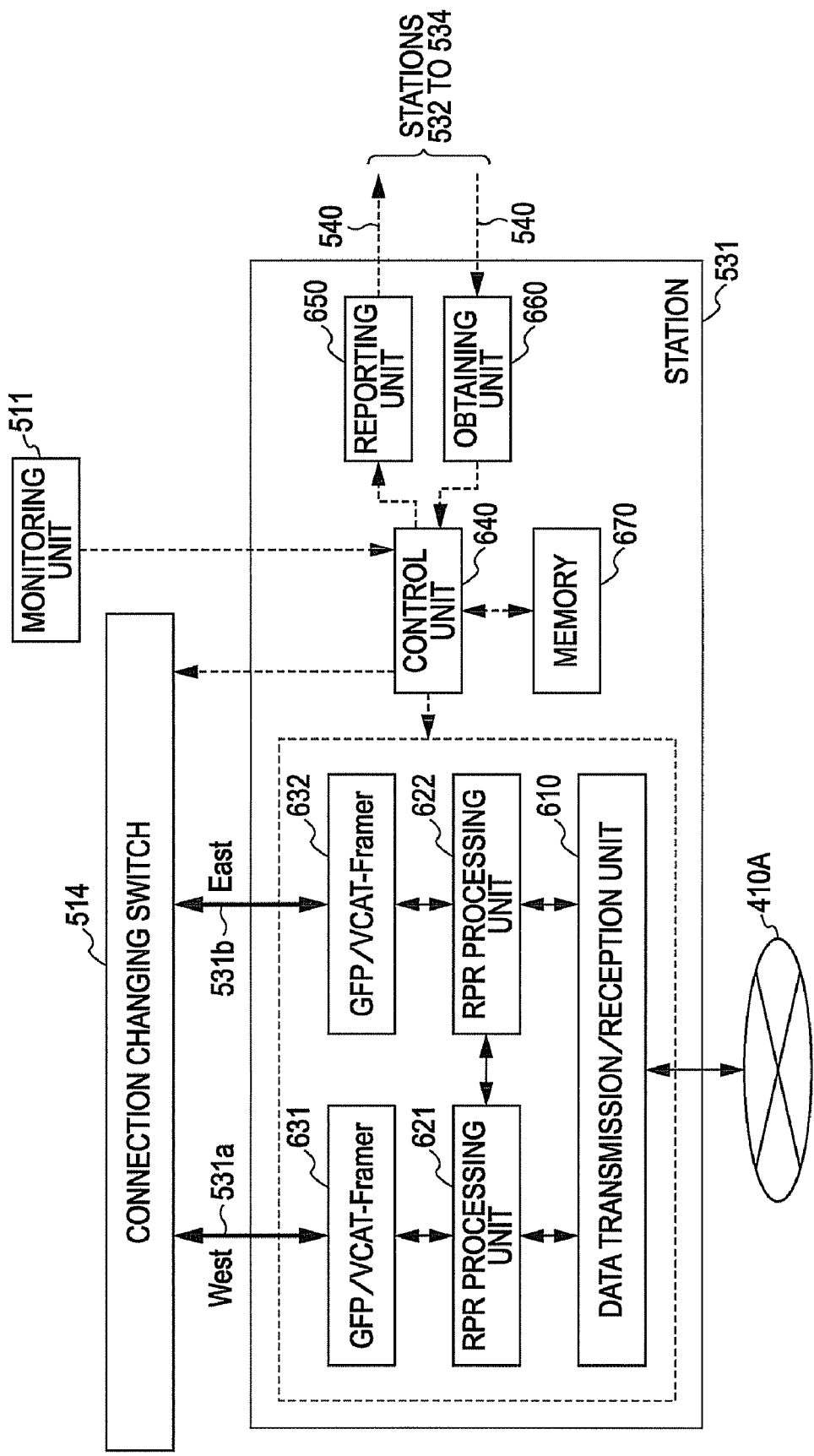
FIG. 6 is a block diagram illustrating a specific example of a station illustrated in FIG. 5.

FIG. 6 is a block diagram illustrating a specific example of the station illustrated in FIG. 5. In FIG. 6, the same configurations as those illustrated in FIG. 5 are denoted by the same reference numerals, and descriptions thereof are omitted. The station illustrated in FIG. 6 is the station 531 illustrated in FIG. 5. As illustrated in FIG. 6, the station 531 has a data transmission/reception unit 610, a first RPR processing unit 621, a second RPR processing unit 622, a first framer 631, a second framer 632, a control unit 640, a reporting unit 650, an obtaining unit 660, and a memory 670.

The data transmission/reception unit 610 transmits/receives data to/from the user network 410A. Specifically, the data transmission/reception unit 610 receives data transmitted from the user network 410A. The data transmission/reception unit 610 outputs the received data to the first RPR processing unit 621 and the second RPR processing unit 622. Also, the data transmission/reception unit 610 transmits data, output from the first RPR processing unit 621 or the second RPR processing unit 622, to the user network 410A.

In accordance with control of the control unit 640, the first RPR processing unit 621 outputs the data, output from the data transmission/reception unit 610, to the first framer 631. Also, in accordance with control of the control unit 640, the first RPR processing unit 621 outputs data, output from the first framer 631, to the data transmission/reception unit 610 or the second RPR processing unit 622.

In accordance with control of the control unit 640, the second RPR processing unit 622 outputs the data, output from the data transmission/reception unit 610, to the second framer 632. Also, in accordance with control of the control unit 640, the second RPR processing unit 622 outputs data, output from the second framer 632, to the data transmission/reception unit 610 or the first RPR processing unit 621.

The first framer 631 maps the data, output from the first RPR processing unit 621, on a SONET (e.g., GFP/VCAT) frame. The first framer 631 outputs the data-mapped frame via the west-side connection portion 531a. The frame output via the connection portion 531a is output to the connection target (the first high-speed I/F 512 in FIG. 5) connected to the connection portion 531a by the connection changing switch 514.

The second framer 632 maps the data, output from the second RPR processing unit 622, on a SONET (e.g., GFP/VCAT) frame. The second framer 632 outputs the data-mapped frame via the east-side connection portion 531b. The frame output via the connection portion 531b is output to the connection target (the connection portion 532a of the station 532 in FIG. 5) connected to the connection portion 531b by the connection changing switch 514.

Also, the first framer 631 extracts data from a frame input via the connection portion 531a. The first framer 631 outputs the extracted data to the first RPR processing unit 621. The second framer 632 extracts data from a frame input via the connection portion 531b. The second framer 632 outputs the extracted data to the second RPR processing unit 622.

The control unit 640 is responsible for overall control of the station 531. When the station 531 is installed in the slot of the shelf, the control unit 640 accesses the monitoring unit 511 to obtain the slot number of the station 531. Also, the control unit 640 controls the first RPR processing unit 621 and the second RPR processing unit 622 to perform RPR protocol control.

Also, the control unit 640 outputs the slot number Slot1 of the station 531, the slot number being obtained from the monitoring unit 511, to the reporting unit 650 as identification information for identifying the station 531. Also, the control unit 640 creates a table illustrating a list of the slot numbers Slot3, Slot4, and Slot6 of the stations 532 to 534, the slot numbers being output from the obtaining unit 660, and the slot number Slot1 of the station 531. The control unit 640 causes the memory 670 to store the table.

Also, on the basis of the table stored in the memory 670, the control unit 640 determines the connection target of the connection portion 531a of the station 531 and the connection target of the connection portion 531b. Also, the control unit 640 switches the connection targets of the connection portion 531a and the connection portion 531b to the connection targets determined on the basis of the table. Specifically, the control unit 640 outputs a switching instruction based on the determined connection targets to the connection changing switch 514, to thereby switch the connection targets.

The reporting unit 650 repeatedly reports the slot number Slot1, output from the control unit 640, to the stations 532 to 534. The obtaining unit 660 obtains the slot numbers Slot3, Slot4, and Slot6 repeatedly reported from the stations 532 to 534 and outputs the slot numbers Slot3, Slot4, and Slot6 to the control unit 640. The slot number reporting and obtaining performed by the reporting unit 650 and the obtaining unit 660 are performed through the control-signal line 540 illustrated in FIG. 5.

The control unit 640 is, for example, a CPU (central processing unit). The first RPR processing unit 621, the second RPR processing unit 622, the first framer 631, and the second framer 632 are, for example, dedicated chips having those functions. Although a specific example of the configuration of the station 531 has been described above, specific examples of the configurations of the stations 532 to 534 are also analogous thereto.

Figure 7:
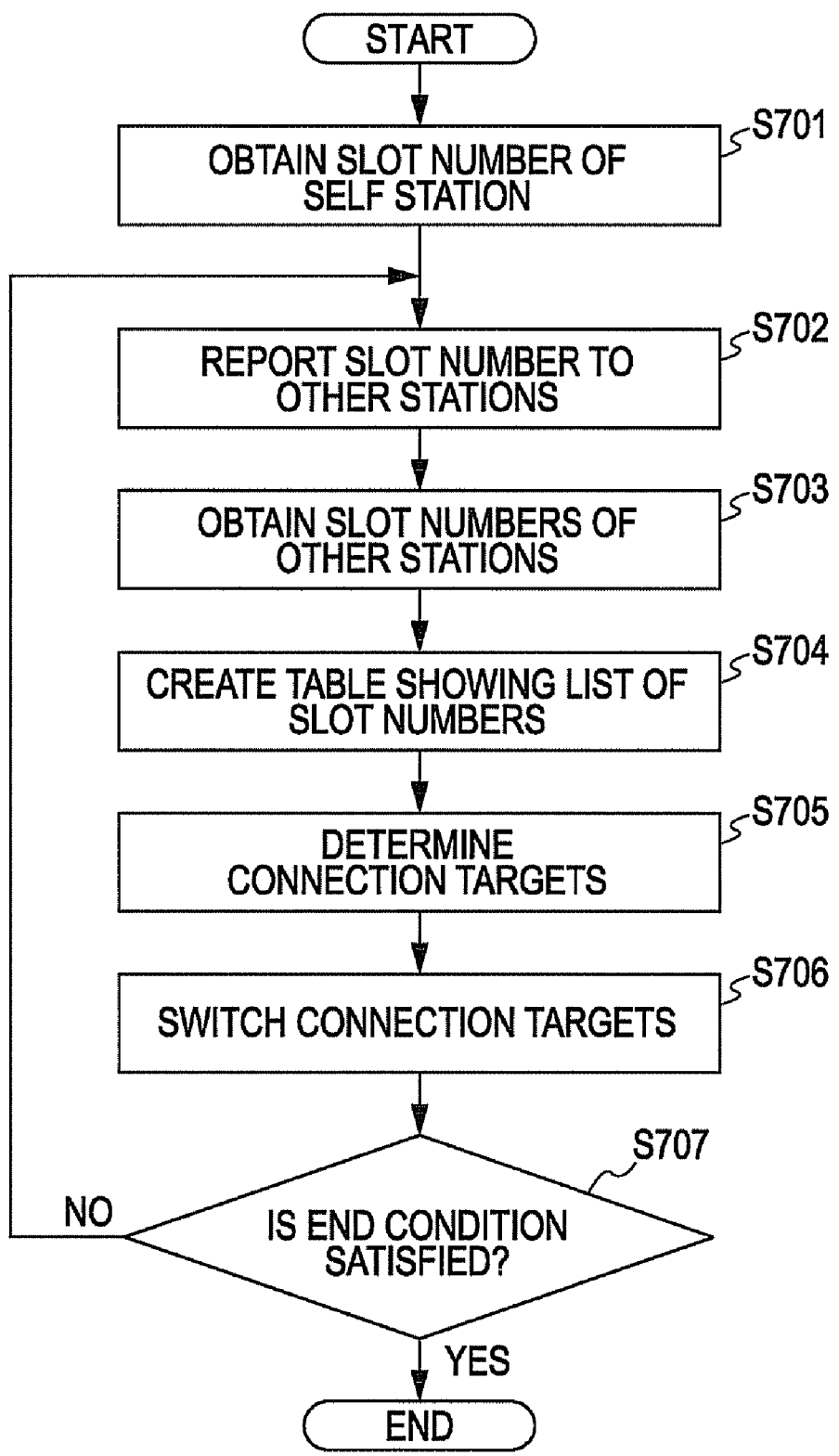
FIG. 7 is a flowchart illustrating one example of the operation of the station illustrated in FIG. 5.

FIG. 7 is a flowchart illustrating one example of the operation of the station illustrated in FIG. 5. As illustrated in FIG. 7, first, the control unit 640 obtains the slot number of the slot 521 that accommodates the self station (the station 531) from the monitoring unit 511 (step S701). Next, the reporting unit 650 reports the slot number, obtained in step S701, to the other stations (the stations 532 to 534) (step S702).

Next, the obtaining unit 660 obtains the slot numbers reported from the other stations (step S703). Next, the control unit 640 creates a table illustrating a list of the slot number obtained in step S701 and the slot numbers obtained in step S703 (step S704). Next, on the basis of the table created in step S704, the control unit 640 determines connection targets of the self station (step S705).

Next, the control unit 640 switches the connection targets of the self station to the connection targets determined in step S705 (step S706). Next, the control unit 640 determines whether or not an operation end condition is satisfied (e.g., whether or not an end instruction given by a user is received) (step S707). When the end condition is not satisfied (step S707: No), the process returns to step S702 to continue the processing.

When the end condition is satisfied (step S707: Yes), the series of processing ends. A step that is analogous to each step described above is simultaneously executed on the stations 532 to 534, so that, when a failure occurs in any of the stations 531 to 534, a connection path that bypasses the station where the failure occurred can be automatically formed.

Specifically, each of the stations 531 to 534 executes step S704 in FIG. 7, so that the stations 531 to 534 create the identical table. Then, on the basis of the created table, each of the stations 531 to 534 determines connection targets of the self station by the same method (see FIG. 8) and switches the connection targets.

Figure 8:
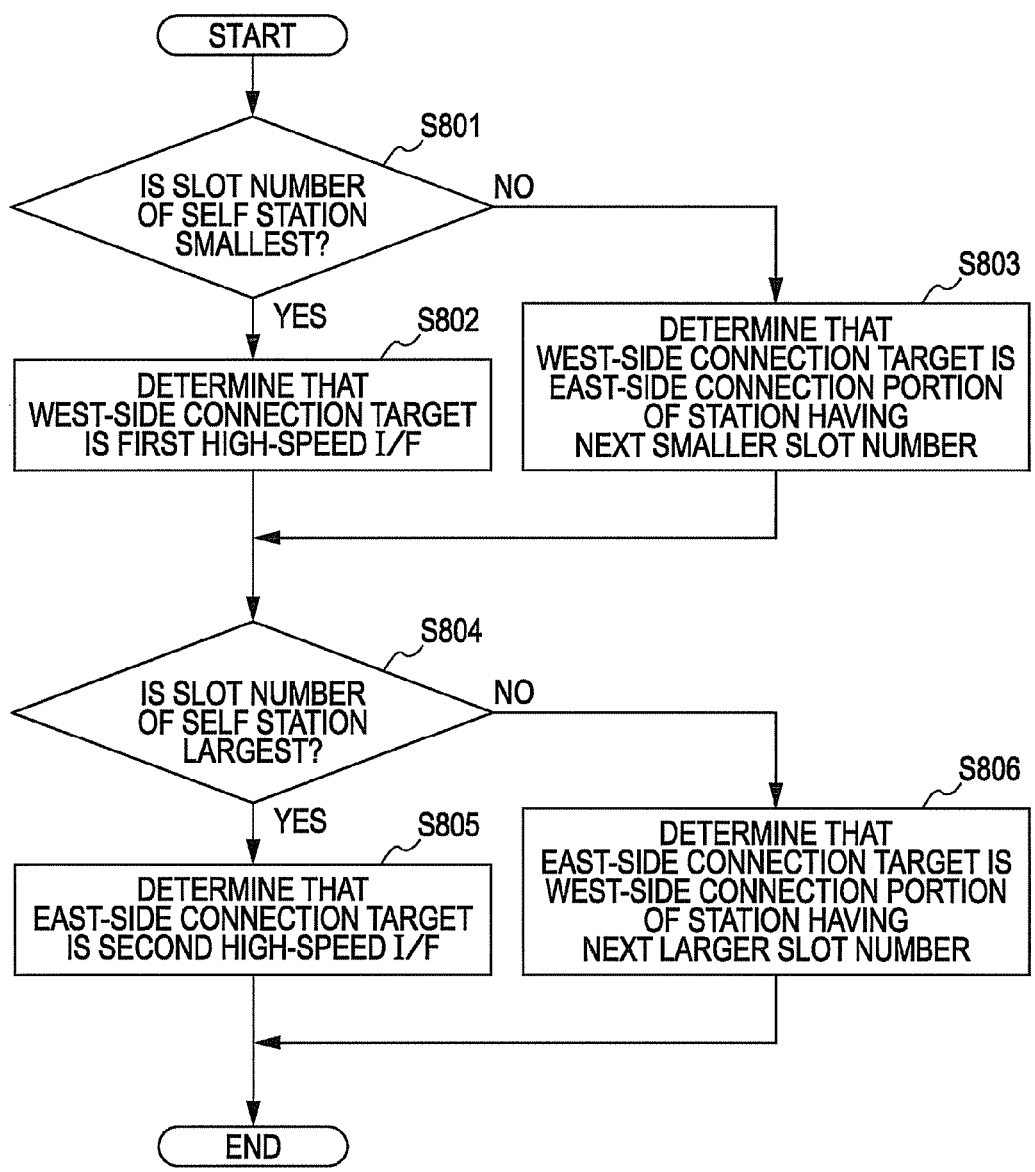
FIG. 8 is a flowchart illustrating a specific example of step S705 illustrated in FIG. 7.

FIG. 8 is a flowchart illustrating a specific example of step S705 illustrated in FIG. 7. As illustrated in FIG. 8, first, a determination is made as to whether or not the slot number of the self station is the smallest of the slot numbers in the table created in step S704 in FIG. 7 (step S801). When the slot number of the self station is the smallest of the slot numbers (step S801: Yes), it is determined that the west-side connection target of the self station is the first high-speed I/F 512 (step S802), and the process proceeds to step S804 to continue the processing.

When the slot number of the self station is not the smallest of the slot numbers in step S801 (step S801: No), it is determined that the west-side connection target of the self station is the east-side connection portion of the station having the next smaller slot number than the slot number of the self station (step S803), and the process proceeds to step S804 to continue the processing.

Next, a determination is made as to whether or not the slot number of the self station is the largest of the slot numbers in the table created in step S704 in FIG. 7 (step S804). When the slot number of the self station is the largest of the slot numbers (step S804: Yes), it is determined that the east-side connection target of the self station is the second high-speed I/F 513 (step S805), and the series of processing ends.

When the slot number of the self station is not the largest of the slot numbers in step S804 (step S804: No), it is determined that the east-side connection target of the self station is the west-side connection portion of the station having the next larger slot number than the slot number of the self station (step S806), and the series of processing ends.

Figure 9:
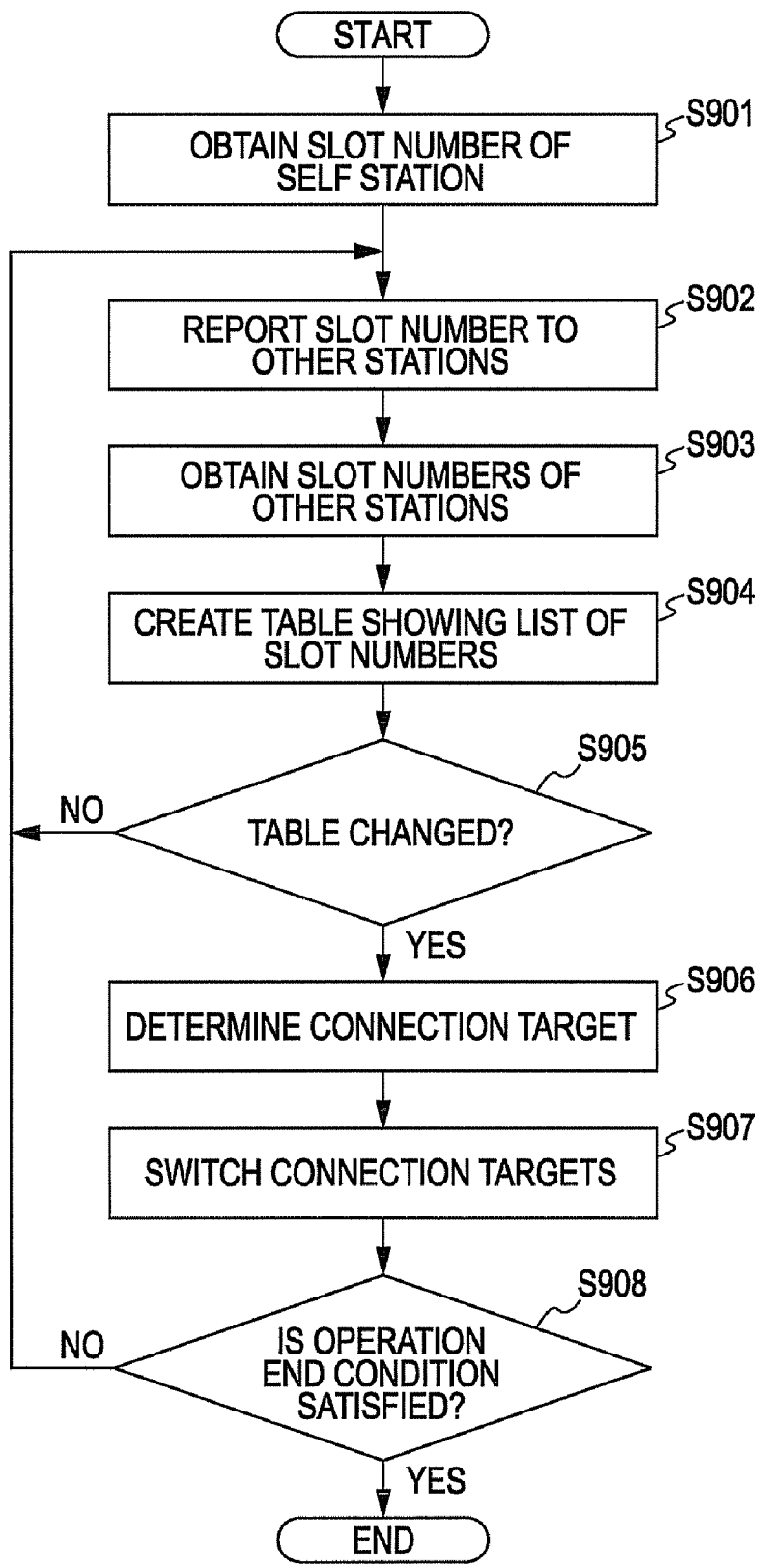
FIG. 9 is a flowchart illustrating another example of the operation of the station illustrated in FIG. 5.

FIG. 9 is a flowchart illustrating another example of the operation of the station illustrated in FIG. 5. In FIG. 9, steps S901 to S904 are analogous to steps S701 to S704 illustrated in FIG. 7, and thus, descriptions thereof are omitted. After step S904, the control unit 640 determines whether or not the latest table crated in step S904 has changed from the table created in step S904 of the last time (step S905).

When the table has not changed in step S905 (step S905: No), the process returns to step S902 to continue the processing. When the table has changed (step S905: Yes), the control unit 640 determines the connection target of the self station (step S906) on the basis of the table created in step S904.

Since steps S907 and S908 are analogous to steps S706 and S707 illustrated in FIG. 7, descriptions thereof are omitted. In this manner, only when the created table has changed, the process proceeds to the determination process in step S906. Thus, it is possible to prevent the determination process illustrated in FIG. 8 from being continuously executed also when no failure has occurred in another station.

Thus, it is possible to reduce the period of the loop of steps S901 to S905 without increasing the amount of processing performed by the control unit 640. A reduction in the period of the loop of steps S901 to S905 makes it possible to immediately detect a failure that occurs in another station. The specific example of the connection-target determination process illustrated in FIG. 8 can also be used in step S906 in FIG. 9. Next, a specific example of the operation described in FIGS. 7 to 9 is descried.

FIG. 10 is a drawing (part 1) illustrating a table created by the control unit. A table 1000 illustrated in FIG. 10 is a table mutually created by the stations 531 to 534 when the line accommodating device 500 is in the state illustrated in FIG. 5. In the table 1000, the presence/absence of reporting of a slot number is stored for each of all the slot numbers (Slot1 to Slot6). In the table 1000, a slot number that has been properly obtained is expressed by "○" and a slot number that has not been properly obtained is expressed by "x".

When the line accommodating device 500 is in the state illustrated in FIG. 5, the stations 531 to 534 are installed in the corresponding slots 521, 523, 524, and 526 and no failure is occurring in the stations 531 to 534. Thus, each of the stations 531 to 534 can properly obtain all the slot numbers of the other stations.

Thus, the presence/absence of the reporting of the slot numbers Slot1, Slot3, Slot4, and Slot6 is expressed by "○". Also, no stations are installed in the slot 522 and the slot 525. Thus, the presence/absence of the reporting of the slot numbers Slot2 and Slot5 is expressed by "x".

Connection-target determination performed by the station 531 in this case is described. The slot number Slot1 of the station 531 is the smallest of the slot numbers having "○" in the table 1000. Thus, the station 531 determines that the connection target of the west-side connection portion 531a of the self station is the first high-speed I/F 512.

Also, the next smaller slot number than the slot number Slot1 of the station 531 is Slot3 of the slot numbers having "○" in the table 1000. Thus, the station 531 determines that the connection target of the connection portion 531b of the self station is the west-side connection portion 532a of the station 532 accommodated in the slot 523.

Connection-target determination performed by the station 532 is described next. The next smaller slot number than the slot number Slot3 of the station 532 is Slot1 of the slot numbers having "○" in the table 1000. Thus, the station 532 determines that the connection target of the west-side connection portion 532a of the self station is the east-side connection portion 531b of the station 531 accommodated in the slot 521.

Also, the next larger slot number than the slot number Slot3 of the station 532 is Slot4 of the slot numbers having "○" in the table 1000. Thus, the station 532 determines that the connection target of the east-side connection portion 532b is the west-side connection portion 533a of the station 533 accommodated in the slot 524.

Connection-target determination performed by the station 533 is described next. The next smaller slot number than the slot number Slot4 of the station 533 is Slot3 of the slot numbers having "○" in the table 1000. Thus, the station 533 determines that the connection target of the west-side connection portion 533a of the self station is the east-side connection portion 532b of the station 532 accommodated in the slot 523.

Also, the next larger slot number than the slot number Slot4 of the station 533 is Slot6 of the slot numbers having "○" in the table 1000. Thus, the station 533 determines that the connection target of the east-side connection portion 533b is the west-side connection portion 534a of the station 534 accommodated in the slot 526.

Connection-target determination performed by the station 534 is described next. The next smaller slot number than the slot number Slot6 of the station 534 is Slot4 of the slot numbers having "○" in the table 1000. Thus, the station 534 determines that the connection target of the west-side connection portion 534a of the self station is the east-side connection portion 533b of the station 533 accommodated in the slot 524.

Also, the slot number Slot6 of the station 534 is the largest of the slot numbers having "○" in the table 1000. Thus, the station 534 determines that the connection target of the west-side connection portion 534b of the self station is the second high-speed I/F 513. Consequently, a connection path in which the stations 531 to 534 are connected in series between the first high-speed I/F 512 and the second high-speed I/F 513 is formed as illustrated in FIG. 5.

FIG. 11 is a drawing (part 2) illustrating a table created by the control unit. A table 1100 illustrated in FIG. 11 is a table created by each of the station 531, the station 533, and the station 534 when the line accommodating device 500 is in the state illustrated in FIG. 5 and a failure occurs in the station 532. The contents of the tables 1100 created by the station 531, the station 533, and the station 534 are the same.

When a failure occurs in the station 532, the station 532 may not report the slot number Slot3. Therefore, the station 531, the station 533, and the station 534 may not properly obtain the slot number Slot3. Thus, the presence/absence of the reporting is changed from "○" to "x" with respect to the slot number Slot3.

Figure 12:
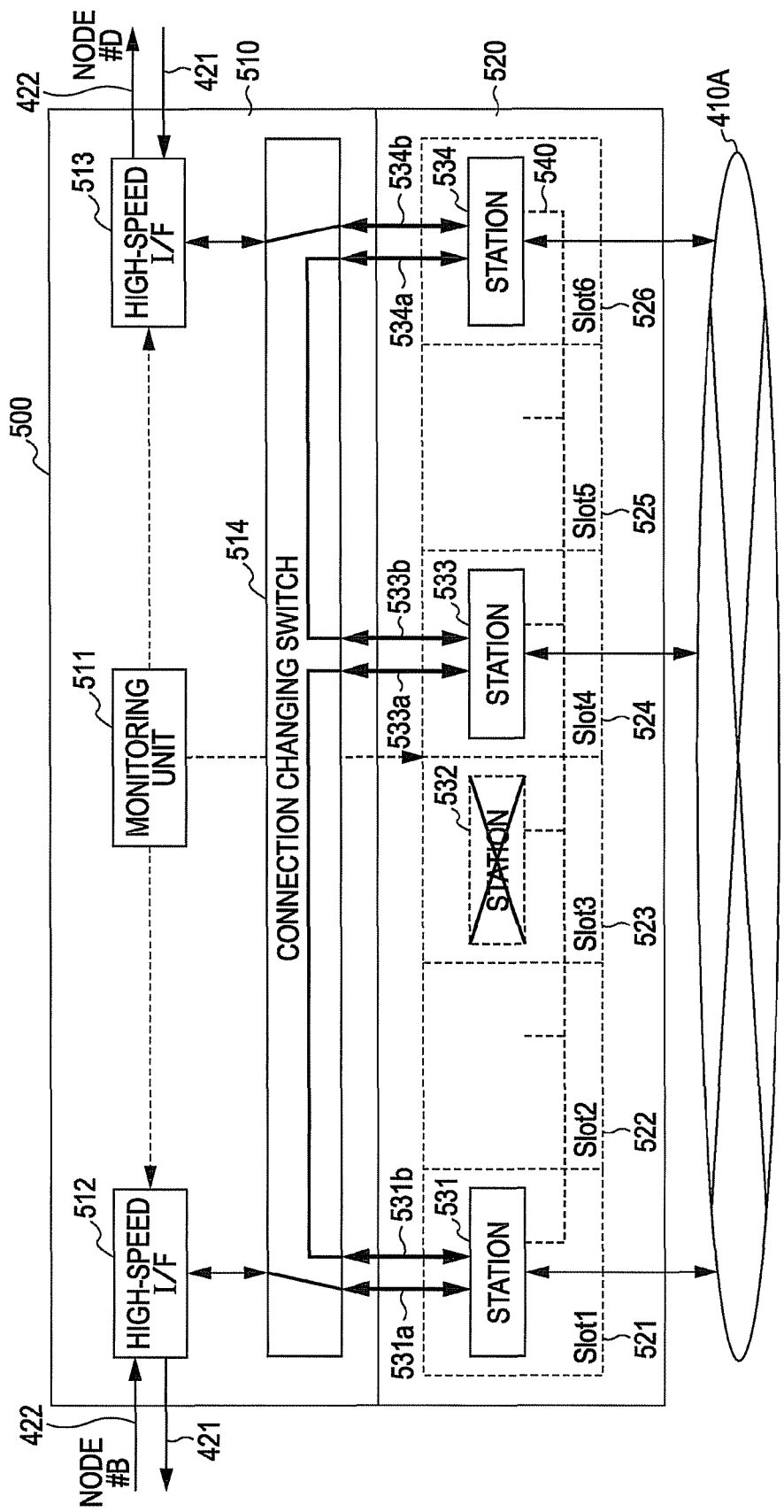
FIG. 12 is a diagram part 1 illustrating a switching operation of each station when a failure occurs.

FIG. 12 is a diagram (part 1) illustrating a switching operation of each station when a failure occurs. FIG. 12 illustrates a switching operation of each station when a failure occurs in the station 532, as described in FIG. 11. The station 531, the station 533, and the station 534 determine the connection targets on the basis of the table 1100 illustrated in FIG. 11.

Connection-target determination performed by the station 531 in this case is described. The slot number Slot1 of the station 531 is the smallest of the slot numbers having "○" in the table 1100. Thus, the station 531 maintains the first high-speed I/F 512 as the connection target of the west-side connection portion 531a of the self station.

Also, the next smaller slot number than the slot number Slot1 of the station 531 is Slot4 of the slot numbers having "○" in the table 1100. Thus, the station 531 switches the connection target of the east-side connection portion 531b to the west-side connection portion 533a of the station 533 accommodated in the slot 524.

Connection-target determination performed by the station 533 is described next. The next smaller slot number than the slot number Slot4 of the station 533 is Slot1 of the slot numbers having "○" in the table 1100. Thus, the station 533 switches the connection target of the west-side connection portion 533a of the self station to the east-side connection portion 531b of the station 531 accommodated in the slot 521.

Also, the next larger slot number than the slot number Slot4 of the station 533 is Slot6 of the slot numbers having "○" in the table 1100. Thus, the station 533 maintains the west-side connection portion 534a of the station 534, accommodated in the slot 526, as the connection target of the east-side connection portion 533b.

Connection-target determination performed by the station 534 is described next. The next smaller slot number than the slot number Slot6 of the station 534 is Slot4 of the slot numbers having "○" in the table 1100. Thus, the station 534 maintains the east-side connection portion 533b of the station 533, accommodated in the slot 524, as the connection target of the west-side connection portion 534a of the self station.

Also, the slot number Slot6 of the station 534 is the largest of the slot numbers having "○" in the table 1100. Thus, the station 534 maintains the second high-speed I/F 513 as the connection target of the east-side connection portion 534b.

Consequently, a connection path that bypasses the station 532 where the failure occurred is automatically formed.

FIG. 13 is a drawing (part 3) illustrating a table created by the control unit. A table 1300 illustrated in FIG. 13 is a table created by each of the stations 531 and the station 533 when the line accommodating device 500 is in the state illustrated in FIG. 12 and a failure further occurs in the station 534. The contents of the tables 1300 created by the station 531 and the station 533 are the same.

When a failure occurs in the station 534, the station 534 may not report the slot number Slot6. Therefore, the station 531 and the station 533 may not properly obtain the slot number Slot6. Thus, the presence/absence of the reporting is changed from "○" to "x" with respect to the slot number Slot6.

Figure 14:
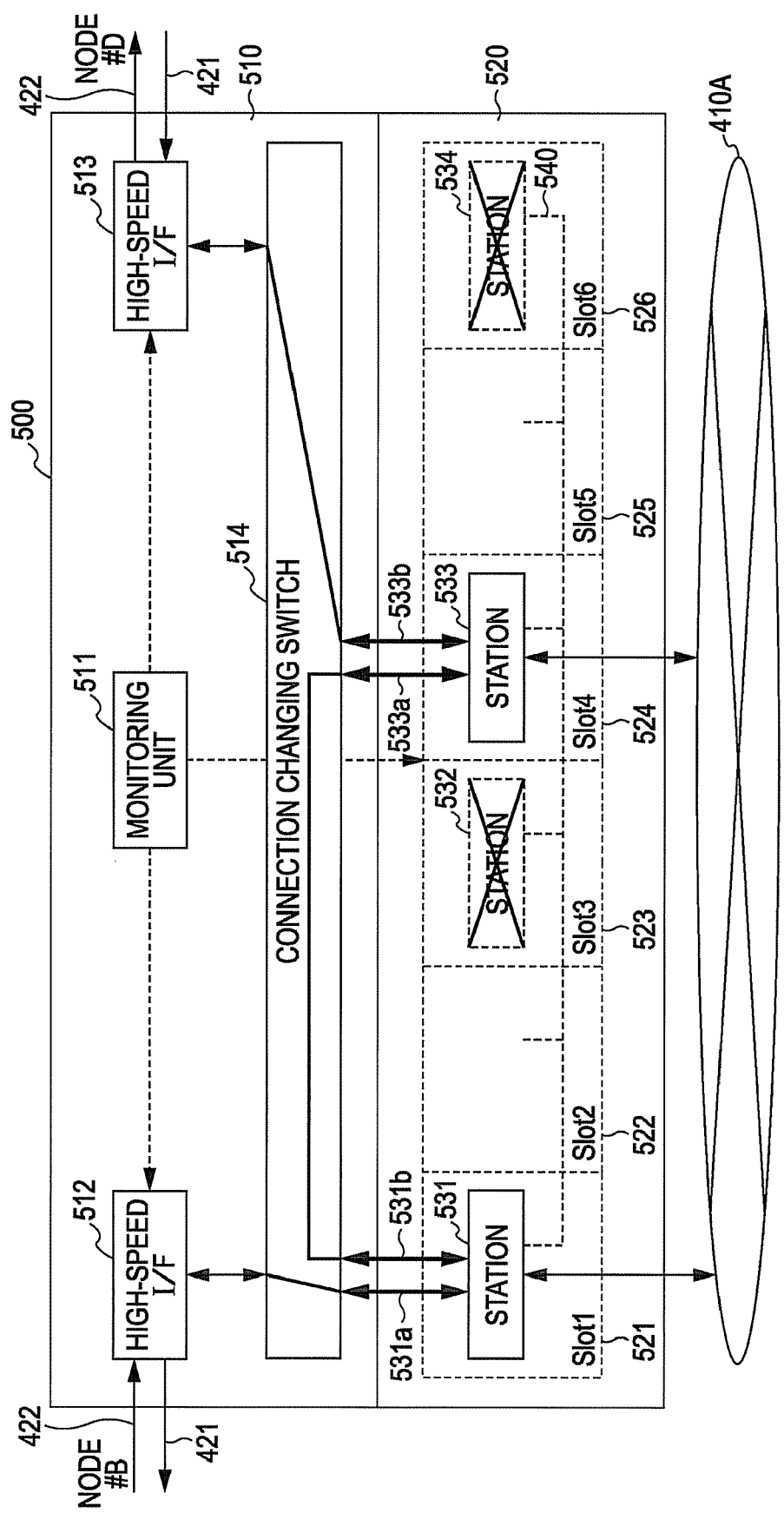
FIG. 14 is a diagram part 2 illustrating a switching operation of each station when a failure occurs.

FIG. 14 is a diagram (part 2) illustrating a switching operation of each station when a failure occurs. FIG. 14 illustrates a switching operation of each station when a failure occurs in the station 534, as described in FIG. 13. The station 531 and the station 533 determine the connection targets on the basis of the table 1300 illustrated in FIG. 13.

Connection-target determination performed by the station 531 in this case is described. The slot number Slot1 of the station 531 is the smallest of the slot numbers having "○" in the table 1300. Thus, the station 531 maintains the first high-speed I/F 512 as the connection target of the west-side connection portion 531a of the self station.

Also, the next larger slot number than the slot number Slot1 of the station 531 is Slot4 of the slot numbers having "○" in the table 1300. Thus, the station 531 maintains the west-side connection portion 533a of the station 533 as the connection target of the east-side connection portion 531b of the self station.

Connection-target determination performed by the station 533 is described next. The next smaller slot number than the slot number Slot4 of the station 533 is Slot1 of the slot numbers having "○" in the table 1300. Thus, the station 533 maintains the east-side connection portion 531b of the station 531 as the connection target of the west-side connection portion 533a of the self station.

Also, the slot number Slot4 of the station 533 is the largest of the slot numbers having "○" in the table 1300. Thus, the station 533 switches the connection target of the east-side connection portion 533b of the self station from the west side of the station 534 to the second high-speed I/F 513. Consequently, a connection path that bypasses the station 534 where the failure occurred can be automatically formed.

As described above, according to the line accommodating device 500 according to the first embodiment, when a failure occurs in one of the stations, the stations in which no failure is occurring can connect each other by independent operations. Thus, even when a failure occurs in one of the stations during occurrence of a failure in the monitoring unit 511, a connection path that bypasses the station where the failure occurred can be automatically formed.

Thus, it is possible to improve the tolerance of the network 400 against a failure in the stations. Also, since the failure detection and the recovery operation can be performed without dependence on the monitoring unit 511, it is possible to reduce the load on the monitoring unit 511.

According to the line accommodating device 500, each station determines, as the connection targets, the station indicated by the next smaller slot number than the slot number of the self station and the station indicated by the next larger slot number than the slot number of the self station. Thus, it is possible to automatically form a connection path in which all of the stations where no failure is occurring are connected in series.

Thus, it is possible to prevent the stations where no failure is occurring and the user networks connected to the stations from being disconnected from the network 400. In addition, the stations 531 to 534 are accommodated in the slots 521 to 526 arranged in the line accommodating device 500. Also, since the slot numbers Slot1 to Slot6 used as the identification information are attached in order of the arrangement of the slots 521 to 526, a connection path that is automatically formed can be formed to be a shortest path that connects the stations where no failure is occurring.

Also, according to the line accommodating device 500, when the next smaller slot number than the slot number of the self station does not exist, each station can determine the first high-speed I/F 512 as the west-side connection target, and when the next larger slot number than the slot number of the self station does not exist, each station can determine that second high-speed I/F 513 as the east-side connection target.

Thus, even when a failure occurs in the station connected to the first high-speed I/F 512 or the second high-speed I/F 513, the first high-speed I/F 512 and the second high-speed I/F 513 can be automatically connected to the stations where no failure is occurring. Thus, it is possible to further improve the tolerance of the network 400 against a failure in the stations.

Also, since the network 400 is a ring-type network, the entire network 400 is affected if one portion of the network 400 is disconnected. In contrast, when the line accommodating device 500 is used for at least any of the nodes #A to #D, even if a station failure occurs during occurrence of a failure in the monitoring unit 511 and a portion of the network 400 is put into an interrupted state, the interrupted state can be automatically recovered. Thus, it is possible to improve the tolerance of the entire network 400 against a failure in the stations.

Also, the network 400 is an RPR-system network. Thus, an RPR failure relief function works when a failure occurs in one of the stations, but the redundancy function is lost against a further failure. In contrast, when the line accommodating device 500 is used for at least any of the nodes #A to #D, even if a station failure occurs during occurrence of a failure in the monitoring unit 511, the station where the failure occurred can be automatically separated from the network 400. Thus, it is possible to maintain the RPR function. Therefore, it is possible to improve the tolerance of the network 400 against a failure in the stations.

A data transmission operation after the ring network is constructed using the above-described procedure is performed as follows. A case in which data transmitted from the user network 410A is relayed by the node #A, the node #B, and the node #C through the use of the transmission path 421 and is transmitted to the user network 410C, as denoted by reference numeral 431 in FIG. 4, is described by way of example. It is assumed in this case that the data from the user network 410A is received by the station 531. It is also assumed that the stations 531, 532, 533, and 534 are installed in the node #A, as illustrated in FIG. 5.

The station 531 outputs the data, received from the user network 410A, via the west-side connection portion 531a in accordance with an RPR protocol. The data output from the connection portion 531a of the station 531 is input to the first high-speed I/F 512. The first high-speed I/F 512 transmits the signal, output from the station 531, to the node #B. Consequently, the data from the user network 410A is transmitted to the node #B.

A case in which the transmission path for transmitting the data, transmitted from the user network 410A, is switched from the transmission path 421 to the transmission path 422, as denoted by reference numeral 432 illustrated in FIG. 4, is described as a second example of the transmission operation of the line accommodating device 500. It is also assumed in this case that the data from the user network 410A is received by the station 531. The station 531 outputs the data, received from the user network 410A, via the east-side connection portion 531b in accordance with the RPR protocol.

The data output via the connection portion 531b is input to the west-side connection portion 532a of the station 532. The station 532 outputs the data, input from the connection portion 532a, via the connection portion 532b in accordance with the RPR protocol. The data output from the east-side connection portion 532b of the station 532 is input to the west-side connection portion 533a of the station 533. The station 533 outputs the data, input from the connection portion 533a, via the connection portion 533b in accordance with the RPR protocol.

The signal output from the connection portion 533b of the station 533 is input to the west-side connection portion 534a of the station 534. The station 534 outputs the signal, input from the connection portion 534a, via the connection portion 534b in accordance with the RPR protocol. The data output from the east-side connection portion 534b of the station 534 is input to the second high-speed I/F 513. The second high-speed I/F 513 transmits the data, input from the station 534, to the node #D. Consequently, the data from the user network 410A is transmitted to the node #D.

A case, illustrated in FIG. 4, in which data transmitted from the user network 410B is relayed by the node #B, the node #A, and the node #D through the use of the transmission path 422 and is transmitted to the user network 410D is described as a third example of the transmission operation of the line accommodating device 500. It is also assumed in this case that the line accommodating device 500 relays the data transmitted from the node #B and transmits the data to the node #D.

The first high-speed I/F 512 receives the data transmitted from the node #B. The first high-speed I/F 512 outputs the received data to the west-side connection portion 531a of the station 531. The station 531 outputs the data, output from the first high-speed I/F 512, via the east-side connection portion 531b in accordance with the RPR protocol.

The data output from the connection portion 531b is input to the west-side connection portion 532a of the station 532. The station 532 outputs the data, input from the connection portion 532a, via the connection portion 532b in accordance with the RPR protocol. The data output via the east-side connection portion 532b of the station 532 is input to the west-side connection portion 533a of the station 533. The station 533 outputs the data, input from the connection portion 533a, via the connection portion 533b in accordance with the RPR protocol.

The data output via the connection portion 533b of the station 533 is input to the west-side connection portion 534a of the station 534. The station 534 outputs the data, input from the connection portion 534a, via the connection portion 534b in accordance with the RPR protocol. The data output via the east-side connection portion 534b of the station 534 is input to the second high-speed I/F 513. The second high-speed I/F 513 transmits the data, input from the station 534, to the node #D. Consequently, the data transmitted from the node #B is transmitted to the node #D.

A case, illustrated in FIG. 4, in which data transmitted from the user network 410B is relayed by the node #B and the node #A through the use of the transmission path 422 and is transmitted to the user network 410A is described as a fourth example of the transmission operation of the line accommodating device 500. It is assumed in this case that the line accommodating device 500 relays the data transmitted from the node #B and transmits the data to the user network 410A.

It is also assumed that the data is transmitted to, of the user network 410A, particularly, the network connected to the station 533. The first high-speed I/F 512 receives the data transmitted from the node #B and outputs the received data to the west-side connection portion 531a of the station 531. The station 531 outputs the data, output from the first high-speed I/F 512, via the east-side connection portion 531b in accordance with the RPR protocol.

The data output via the connection portion 531b is input to the west-side connection portion 532b of the station 532. The station 532 outputs the data, input from the connection portion 532a, via the connection portion 532b in accordance with the RPR protocol. The data from the connection portion 532b of the station 532 is input to the connection portion 533a of the station 533.

The station 533 transmits the data, input from the connection portion 533a, to the user network 410A in accordance with the RPR protocol. Consequently, the data transmitted from the node #B is transmitted to, of the user network 410A, the network connected to the station 533. In this manner, each station performs an operation according to the RPR protocol to thereby change the transmission direction between the node #B, the node #3, and the user network 410A.

SECOND EMBODIMENT

Figure 15:
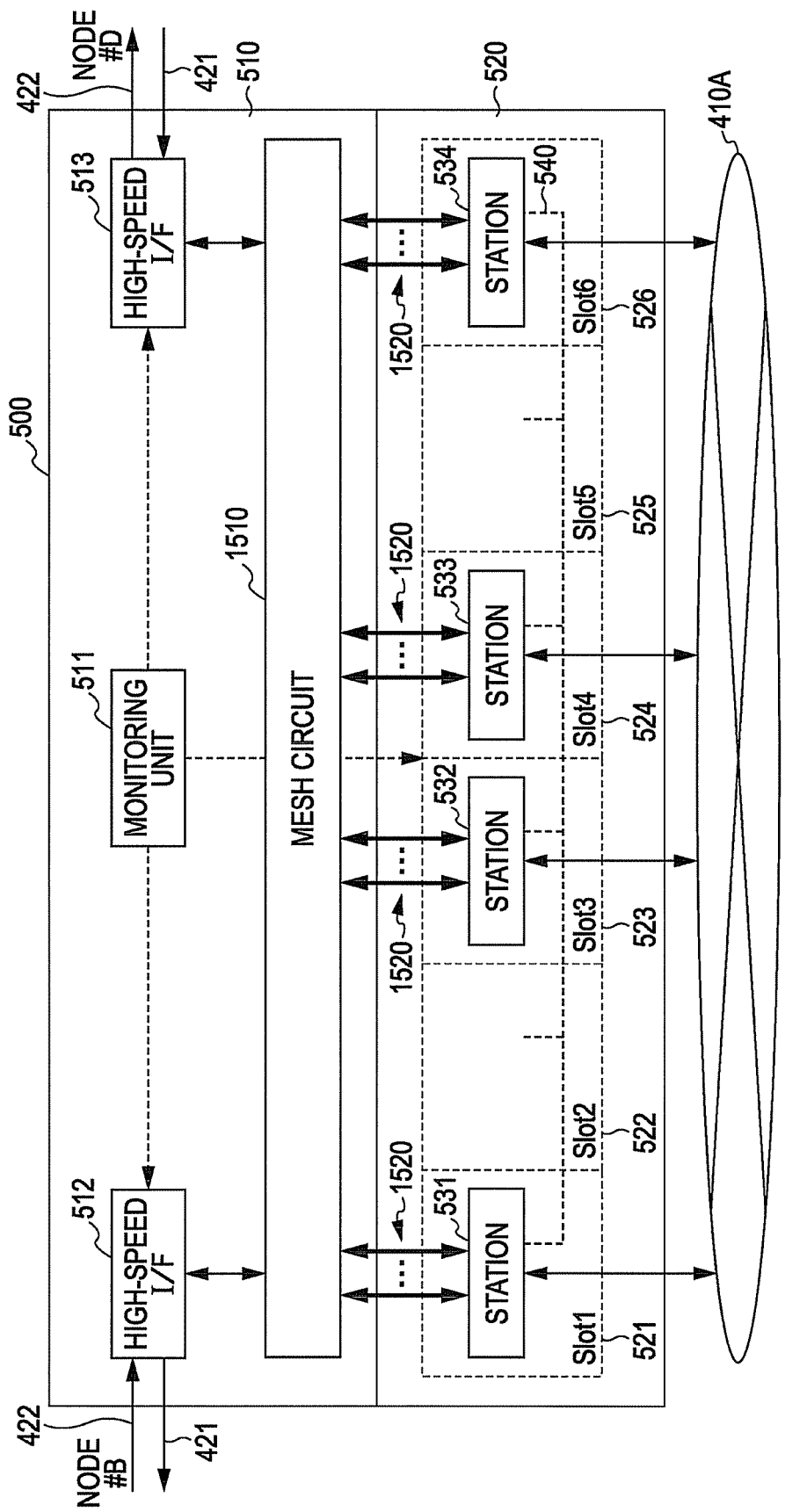
FIG. 15 is a block diagram illustrating the configuration of a line accommodating device according to a second embodiment.

FIG. 15 is a block diagram illustrating the configuration of a line accommodating device according to a second embodiment. In FIG. 15, the same configurations as those illustrated in FIG. 5 are denoted by the same reference numerals, and descriptions thereof are omitted. As illustrated in FIG. 15, a line accommodating device 500 according to the second embodiment has a mesh network 1510 instead of the connection changing switch 514 in the configuration illustrated in FIG. 5.

The mesh network 1510 is a connecting block that connects, in a meshed manner, the first high-speed I/F 512, the second high-speed I/F 513, and the west-side and the east-side connection portions of the stations installed in the slots 521 to 526. Each of the stations 531 to 534 has a group of connection paths 1520 for connection with the first high-speed I/F 512, the second high-speed I/F 513, and another station via the mesh network 1510.

Each of the stations 531 to 534 selects the west-side and east-side connection portions of the self station from the group of connection paths 1520 to thereby switch the connection targets of the self station. Thus, the stations 531 to 534 can switch the connection targets of the self stations by respective independent operations.

In this case, the connection changing switch 514 is not utilized. Thus, it is possible to prevent an event in which the network 400 may not recover from an interrupted state when a failure occurs in one of the relay modules during occurrence of a failure in the connection changing switch 514.

Figure 16:
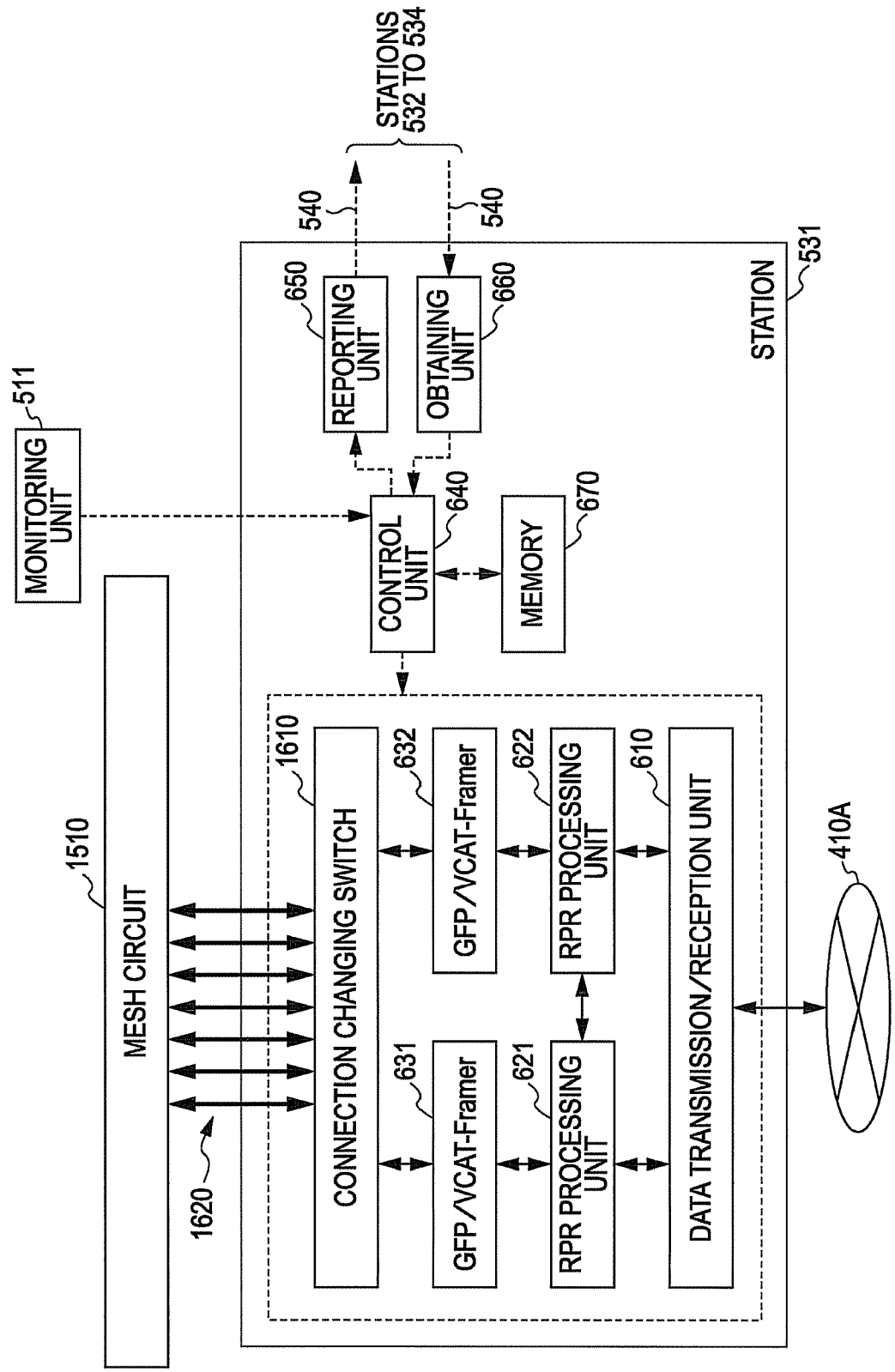
FIG. 16 is a block diagram illustrating a specific example of a station illustrated in FIG. 15.

FIG. 16 is a block diagram illustrating a specific example of the station illustrated in FIG. 15. In FIG. 16, the same configurations as those illustrated in FIG. 6 or FIG. 15 are denoted by the same reference numerals, and descriptions thereof are omitted. As illustrated in FIG. 16, the station 531 has a connection changing switch 1610 connected to a group of connection paths 1620, in addition to the configuration illustrated in FIG. 6.

The first framer 631 outputs a mapped signal to the connection changing switch 1610. Also, the first framer 631 extracts data from a signal input from the connection changing switch 1610. The second framer 632 outputs a mapped signal to the connection changing switch 1610. Also, the second framer 632 extracts data from a signal input from the connection changing switch 1610.

In accordance with control of the control unit 640, the connection changing switch 1610 selects, from the group of connection paths 1620, a connection target for performing signal input/output with the first framer 631. In accordance with control of the control unit 640, the connection changing switch 1610 selects, from the group of connection paths 1620, a connection target for performing signal/output with the second framer 632. The control unit 640 outputs a switching instruction based on the determined connection targets to the connection changing switch 1610 to thereby perform switching similar to the connection-target switching described in FIG. 6.

As described above, the line accommodating device 500 according to the second embodiment provides advantages of the line accommodating device 500 according to the second embodiment and also can switch the connection targets of the stations by independent operations of the stations 531 to 534. Thus, it is possible to further improve the tolerance of the network 400 against a failure in the relay modules, compared to a case using the connection changing switch that switches the connections of the stations in an integrated manner.

Figure 17:
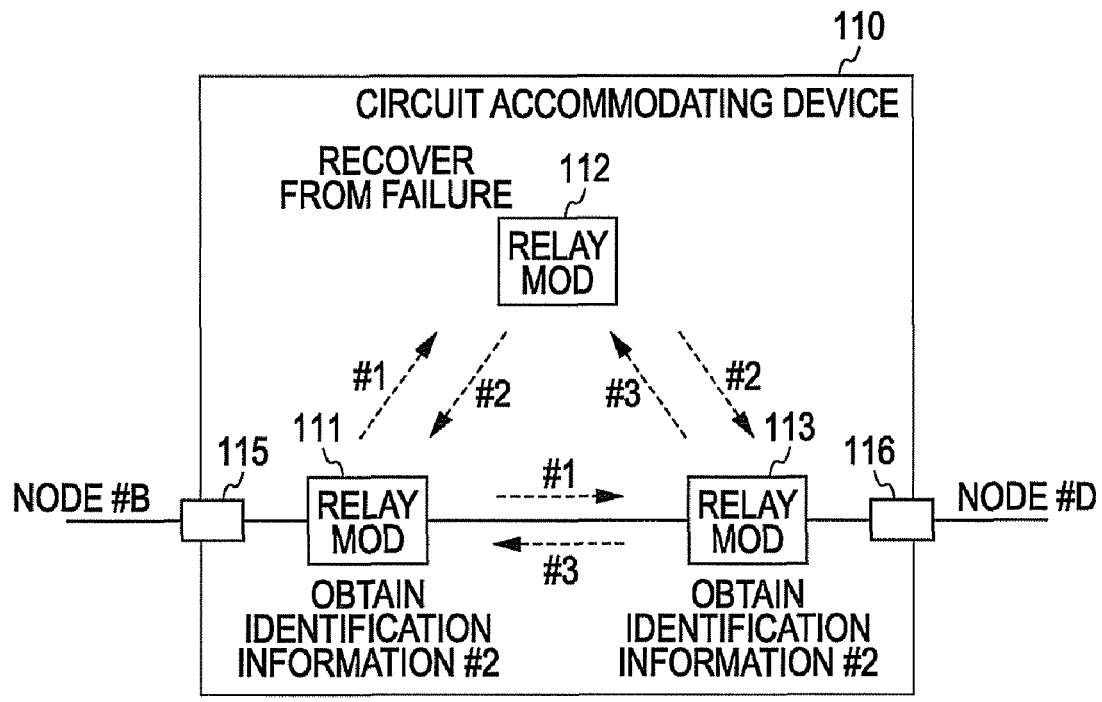
FIG. 17 is a diagram part 4 illustrating an overview of this line accommodating device.

Overview of Operation of Line Accommodating Device During Recovery of Relay Module FIG. 17 is a diagram (part 4) illustrating an overview of this line accommodating device. In FIG. 17, the same portions as those illustrated in FIG. 3 are denoted by the same reference numerals, and description thereof are omitted. A description is given of a case in which, after the state illustrated in FIG. 3, the relay module 112 recovers from the failure. As illustrated in FIG. 17, the relay module 112 that has recovered from the failure resumes the reporting of the identification information #2.

When the reporting of the identification information #2 from the relay module 112 is resumed, the relay module 111 and the relay module 113 can detect that the relay module 112 has recovered from the failure. In this state, the connection-target determination operation performed by each of the relay modules 111 to 113 is the same as the operation described in FIGS. 1 to 3, and thus, a description thereof is omitted here.

Figure 18:
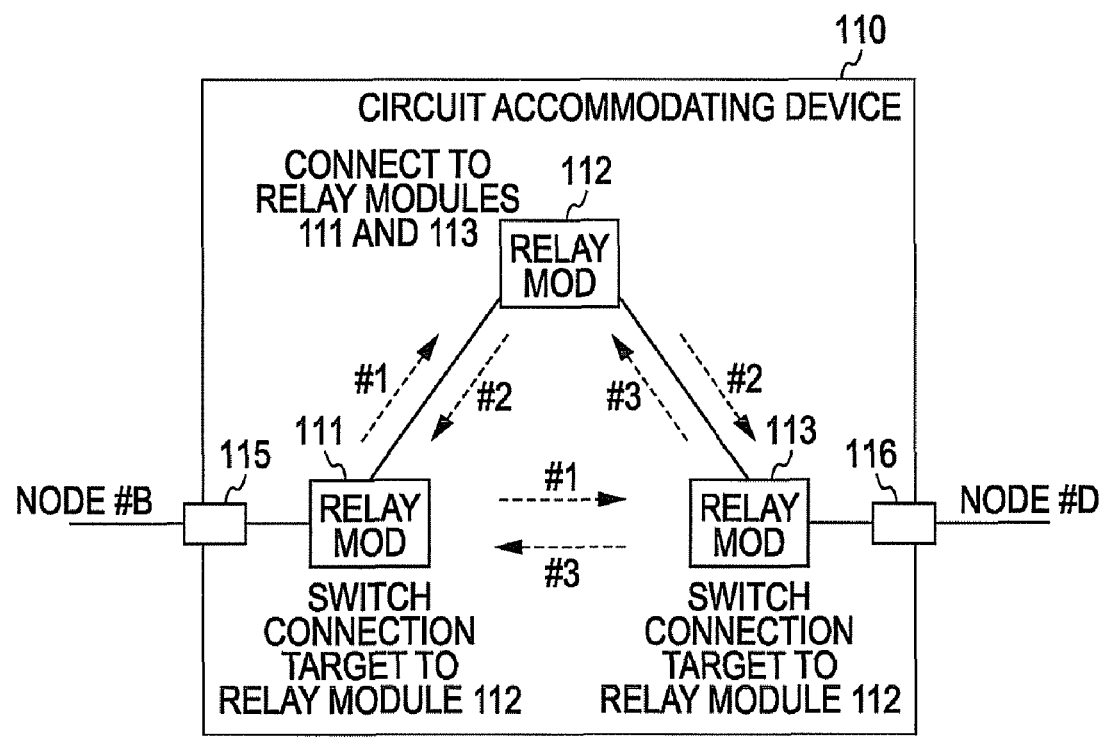
FIG. 18 is a diagram part 5 illustrating an overview of this line accommodating device.

FIG. 18 is a diagram (part 5) illustrating an overview of this line accommodating device. In FIG. 18, the same portions as those illustrated in FIG. 3 are denoted by the same reference numerals, and description thereof are omitted. After the relay module 112 recovers from the failure (see FIG. 17), the relay module 111 switches one of the connection targets from the relay module 113 to the relay module 112. As the other connection target of the relay module 111, the first interface 115 is maintained.

Also, the relay module 112 has properly obtained the identification information #1 and the identification information #3. Thus, the relay module 112 connects to the relay module 111 indicated by the identification information #1 having the next smaller value than the identification information #2 of the self module and also connects to the relay module 113 indicated by the identification information #3 having the next larger value than the identification information #2.

Also, the relay module 113 switches one of the connection targets from the relay module 111 to the relay module 112. As the other connection target of the relay module 113, the second interface 116 is maintained. In this manner, when the relay module 112 recovers from a failure, a connection path that passes through the recovered relay module 112 is automatically formed.

As described above, according to the disclosed line accommodating device and the control method, it is possible to improve the tolerance of the network against a failure in the relay modules. Although a case in which the network 400 is a ring-type network that supports an RPR has been described in each embodiment described above, the present invention is not necessarily limited to a case in which the network 400 supports an RPR, and the network 400 may be a network in which the nodes #A to #D are connected on a straight line. In this case, provision of an intermediate node, which is a non-terminal node, of the nodes #A to #D with the line accommodating device 500 makes it possible to improve the tolerance of the network.

Although a configuration in which signals to be transmitted between the nodes are relayed after being temporarily converted by the line accommodating device 500 into electrical signals has been described in each embodiment described above, a configuration in which signals to be transmitted between the nodes are relayed as optical signals may also be used. In this case, a connection path formed by the stations is also an optical path. Also, although the network 400 has been described as being an optical network, the line accommodating device 500 is also applicable to an electrical-line network.

Also, a case in which all of the stations 531 to 534 accommodated by the line accommodating device 500 are stations that belong to the ring-type network 400 has been described in each embodiment described above. As opposed to it, one of the stations 531 to 534 may be a station that belongs to a network that is different from the network 400.

In this case, the stations 531 to 534 attach the number of the network to which the self stations belong to the slot numbers that serve as identification information of the self stations, and report the resulting numbers to the other stations. The stations 531 to 534 then each create a table illustrating a slot-number list in which, of the slots numbers obtained from the other stations, the attached network numbers are the same as the network number of the network to which the self station belongs.

Thus, of the stations 531 to 534, the stations that belong to the network 400 can form a connection path that bypasses, of the stations 531 to 534, the stations that belongs to another network. Consequently, the line accommodating device 500 can also accommodate, in a mixed manner, a station or stations that belong to a network that is different from the network 400. With respect to the above-described embodiments, the following appendices are further disclosed.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A line accommodating device for accommodating lines of a first network and a second network, the line accommodating device comprising:

an interface to connect to the first network;
a connecting block to connect to the interface; and
a plurality of relay modules to electrically connect to the connecting block and the second network, respectively, each respective relay module of the plurality of relay modules including:
  a reporting unit to notify the other relay modules via the connecting block of identification information for identifying the respective relay module,
  an obtaining unit to obtain identification information of the other relay modules via the connecting block, and
  a controller to execute an operation, the operation including:
    making a table including the identification information of the other relay modules obtained by the obtaining unit,
    determining a connection target of the respective relay module among the relay modules for which identification information is included in the table, and
    connecting with the determined connection target.

2. The line accommodating device of claim 1, wherein, when the identification information included in the table has changed and thereby indicates that the connection target has changed, the controller switches the connection target of the respective relay module in accordance with the changed identification information in the table.

3. The line accommodating device of claim 1:
wherein the identification information of each relay module of the plurality of modules includes a value relative to values of the other relay modules;
wherein the controller included in a first relay module of the plurality of relay modules determines more than one connection target of the first relay module, one of the connection targets being a second relay module of the plurality of relay modules when the value included in the identification information of the second relay module included in the table is a next smaller value than the value included in the identification information of the first relay module, and another of the connection targets being a third relay module of the plurality of relay modules when the value included in the identification information of the third relay module included in the table is a next larger value than the value included in the identification information of the first relay module.

4. The line accommodating device of claim 3:
wherein the interface includes a first interface and a second interface;
wherein the controller determines a connection target of the first relay module to be the first interface when none of the other relay modules has identification information, included in the table, which includes a value that is smaller than the value included in the identification information of the first relay module; and
wherein the controller determines a connection target of the first relay module to be the second interface when none of the other relay modules has identification information, included in the table, which includes a value that is larger than the value included in the identification information of the first relay module.

5. The line accommodating device of claim 1, further comprising a shelf having slots, each of the slots capable of accommodating a relay module, each of the slots having a different slot number, wherein the identification information of a relay module being accommodated in a respective slot includes the slot number of the respective slot.

6. The line accommodating device of claim 1, wherein the first network is a ring type network.

7. The line accommodating device of claim 1, wherein the first network is a Resilient Packet Ring network, and the relay modules control line access in the Resilient Packet Ring network.

8. A method for controlling a line accommodating device for accommodating lines of a first communication network and a second communication network, the line accommodating device including an interface to connect to the first communication network, a connecting block to connect to the interface, and a plurality of relay modules to electrically connect to the connecting block and the second communication network, respectively, the method comprising, for a respective relay module:
   notifying the other relay modules via the connecting block of identification information for identifying the respective relay module,
   obtaining the identification information of the other relay modules via the connecting block,
   making a table including the identification information of the other relay modules obtained by said obtaining,
   determining a connection target of the respective relay module among the relay modules for which identification information is included in the table, and
   connecting with the determined connection target.

9. An apparatus comprising:
   an interface for connecting to a first network;
   a connecting block for connecting to the interface; and
   a plurality of relay modules for electrically connecting to the connecting block and a second network, respectively, each respective relay module of the plurality of relay modules including:
      means for notifying the other relay modules via the connecting block of identification information for identifying the respective relay module,
      means for obtaining identification information of the other relay modules via the connecting block, and
      means for executing an operation, the operation including:
         making a table including the obtained identification information of the other relay modules,
         determining a connection target of the respective relay module among the relay modules for which identification information is included in the table, and
         connecting with the determined connection target.

* * * * *